(12) United States Patent
Huelsen et al.

(10) Patent No.: US 12,496,985 B2
(45) Date of Patent: Dec. 16, 2025

(54) ROOF MODULE FOR FORMING A VEHICLE ROOF

(71) Applicant: Webasto SE, Stockdorf (DE)

(72) Inventors: Michael Huelsen, Stockdorf (DE); Cedric Langlais, Stockdorf (DE); Maximilian Ehrman, Stockdorf (DE); Juraj Lehotsky, Stockdorf (DE); Heinrich Wüllrich, Stockdorf (DE); Thomas Podolski, Stockdorf (DE); Nikolaus Linner, Stockdorf (DE)

(73) Assignee: Webasto SE, Stockdorf (DE)

( * ) Notice: Subject to any disclaimer, the term of this patent is extended or adjusted under 35 U.S.C. 154(b) by 0 days.

(21) Appl. No.: 18/085,748

(22) Filed: Dec. 21, 2022

(65) Prior Publication Data
US 2023/0123315 A1    Apr. 20, 2023

Related U.S. Application Data

(63) Continuation-in-part of application No. PCT/EP2022/064106, filed on May 24, 2022.

(30) Foreign Application Priority Data

Jun. 14, 2021 (WO) .................. PCT/EP2021/065951

(51) Int. Cl.
*B60R 11/04* (2006.01)
*G01S 7/02* (2006.01)
(Continued)

(52) U.S. Cl.
CPC .............. *B60R 11/04* (2013.01); *G01S 7/027* (2021.05); *G01S 13/931* (2013.01);
(Continued)

(58) Field of Classification Search
CPC .............. B60R 11/04; B60R 2011/004; B60R 2011/0082; B60R 2011/0092; G01S 2013/93273; G01S 13/931; G01S 17/931
See application file for complete search history.

(56) References Cited

U.S. PATENT DOCUMENTS 4,941,718 A    7/1990  Alexander, III et al.
10,583,775 B2 *  3/2020  Garcia .................. B60Q 1/2692
(Continued)

FOREIGN PATENT DOCUMENTS

CN    106985681 B    3/2020
DE    102019101861 A1    7/2020
(Continued)

OTHER PUBLICATIONS

Weiss et al., Holding device for an environmental monitoring device, Mar. 25, 2021, EPO, DE 10 2019 125 674 A, Machine Translation of Description (Year: 2021).*
(Continued)

*Primary Examiner* — James A English
(74) *Attorney, Agent, or Firm* — Fitch, Even, Tabin & Flannery, LLP

(57) ABSTRACT

A motor vehicle roof module having a panel component whose outer surface at least partially forms the roof skin of the vehicle roof and serves as an outer sealing surface of the roof module, and at least one environmental sensor by means of which a vehicle environment can be detected during autonomous or semi-autonomous driving of the motor vehicle. The roof module has a kinematic system having a drive and configured to move the at least one environmental sensor from a retracted position into a deployed position, in which the at least one environmental sensor protrudes beyond the roof skin to detect the vehicle
(Continued)

environment, and to fix the at least one environmental sensor at least in the deployed position in such a manner that the at least one environmental sensor cannot be moved by an external force.

14 Claims, 19 Drawing Sheets

(51) Int. Cl.
*G01S 13/931* (2020.01)
*B60R 11/00* (2006.01)
*G01S 13/86* (2006.01)

(52) U.S. Cl.
CPC . *B60R 2011/004* (2013.01); *B60R 2011/0082* (2013.01); *B60R 2011/0092* (2013.01); *G01S 13/865* (2013.01); *G01S 13/867* (2013.01); *G01S 2013/93273* (2020.01)

(56) References Cited

U.S. PATENT DOCUMENTS

| | | |
|---|---|---|
| 2017/0356769 A1 | 12/2017 | Williams et al. |
| 2018/0066467 A1* | 3/2018 | Da Deppo .............. B60R 11/04 |
| 2020/0180520 A1* | 6/2020 | Barthel ................ G03B 11/043 |
| 2020/0238923 A1 | 7/2020 | Nickel |
| 2021/0300262 A1* | 9/2021 | Pomparew .............. B60R 11/04 |
| 2022/0314827 A1* | 10/2022 | Podolski ................. B60L 53/16 |
| 2023/0075491 A1* | 3/2023 | Langlais ................ B62D 25/06 |

FOREIGN PATENT DOCUMENTS

| | | |
|---|---|---|
| DE | 102019125674 A1 | 3/2021 |
| DE | 102020102643 A1 | 8/2021 |

OTHER PUBLICATIONS

IPRP issued against corresponding Application No. PCT/EP2022/064106; dated Dec. 14, 2023; In English (16 pages). Cited references provided in previous IDS.

\* cited by examiner (a)

(b)

(c)

(a)

(b)

(c)

(d)

(c)

(d)

(e)

(f)

(a)

(b)

(a)

(b)

ROOF MODULE FOR FORMING A VEHICLE ROOF

CROSS-REFERENCE TO RELATED APPLICATION

This application is a continuation-in-part application of international application no. PCT/EP2022/064106 filed on May 24, 2022, designating the US and claiming priority from international application no. PCT/EP2021/065951 filed on Jun. 14, 2021, which are hereby incorporated herein by reference in their entirety for all purposes.

FIELD

The invention relates to a roof module for forming a vehicle roof on a motor vehicle according to the preamble of claim 1. Furthermore, the invention relates to a roof module.

BACKGROUND

Generic roof modules are widely used in vehicle manufacturing since these roof modules are prefabricated as separate functional modules and can be supplied to the assembly line when manufacturing the vehicle. The outer surface of the roof module at least partially forms a roof skin of the vehicle roof, the roof skin preventing humidity or air flow from entering the vehicle interior. The roof skin is formed by one or more panel components, which can be made of a stable material, such as painted sheet metal or painted or died plastic. The roof module can be part of a rigid vehicle roof or part of a modular roof that can be opened.

Furthermore, the development in vehicle manufacturing tends to focus more and more on autonomously or semi-autonomously driving motor vehicles. To enable the vehicle controller to control the motor vehicle autonomously or semi-autonomously, a number of environmental sensors (such as lidar sensors, radar sensors, (multi-)cameras, etc. including other (electrical) components) are used which are integrated in the roof module, for example, and which detect the environment around the motor vehicle and determine, for example, a current traffic situation from the detected environmental data. Roof modules equipped with a plurality of environmental sensors are also known as roof sensor modules (RSM). The known environmental sensors send and receive electromagnetic signals, such as laser beams or radar beams, signal evaluation allowing a data model of the vehicle environment to be generated and used for controlling the vehicle.

In most cases, the environmental sensors for monitoring and detecting the vehicle environment are attached to the vehicle roof since the vehicle roof is typically the highest point of a vehicle, from which the vehicle environment is easily observable. So far, the environmental sensors have mostly been configured as attachments on top of the vehicle roof in question. This leads to an optical appearance that typically does not satisfy customer demands. Additionally, there is the risk that environmental and weather conditions cause a see-through portion, through which the environmental sensor detects the vehicle environment, to collect dirt and become opaque to the environmental sensor or even suffer damage (e.g., from hail).

For this reason, it is desirable for the environmental sensor to be retractable and deployable in order to satisfy aesthetic aspects, for example, and additionally protect the environmental sensor from environmental conditions when the environmental sensor is in an inactive state. The variety of vehicle types and design demands pose the problem that an installation space available for the associated adjustment mechanism is small because of the other demands on the roof module (e.g., provision of a sunroof or a panoramic roof) and mostly limited to an outer edge area of the roof module. Hence, it is desirable for a suitable space-saving adjustment mechanism to be provided depending on the installation space required. Moreover, known adjustment mechanisms tend to wear over their lifetime, which may cause sluggishness. Therefore, the adjustment mechanism provided is to be optimized in terms of its wear behavior.

SUMMARY

Hence, the object of the invention is to propose a roof module which satisfies the demands described above.

This object is attained by a roof module of the teaching of claim 1. Furthermore, the object is attained by a roof module.

Advantageous embodiments of the invention are the subject matter of the dependent claims. Any and all combinations of at least two features disclosed in the description, the claims, and/or the figures fall within the scope of the invention. Naturally, the explanations given in connection with the roof module equivalently relate to the motor vehicle according to the invention and vice-versa without being redundantly mentioned in its context. In particular, linguistically common rephrasing and/or an analogous replacement of respective terms within the scope of common linguistic practice, in particular the use of synonyms backed by the generally recognized linguistic literature, are of course comprised by the content of the disclosure at hand without every variation having to be expressly mentioned.

According to a first aspect, the roof module according to the invention for forming a vehicle roof of a motor vehicle comprises a panel component whose outer surface at least partially forms a roof skin of the vehicle roof and serves as an outer sealing surface of the roof module. The roof module comprises at least one environmental sensor by means of which a vehicle environment can be detected during autonomous or semi-autonomous driving of the motor vehicle. The roof module according to the invention is characterized by comprising kinematic system comprising a drive and configured to move the environmental sensor from a retracted position into a deployed position, in which the environmental sensor protrudes beyond the roof skin in order to detect the vehicle environment, and to fix the environmental sensor at least in the deployed position in such a manner that the environmental sensor cannot be moved by an external force.

According to a second aspect, the roof module according to the invention for forming a vehicle roof on a motor vehicle comprises a panel component which at least partially forms a roof skin of the vehicle roof, the roof skin serving as an outer sealing surface of the roof module. The roof module comprises at least one environmental sensor configured to detect a vehicle environment in an autonomous or semi-autonomous driving mode of the motor vehicle. The roof module according to the invention is characterized in that it comprises kinematic system having a drive and configured to move the environmental sensor from a retracted position into a deployed position, in which the environmental sensor protrudes over the roof skin in order to detect the vehicle environment, and to fix the environmental sensor in such a manner at least in the deployed position that the environmental sensor cannot be moved by an external force. The kinematic mechanism comprises a slide which is configured to be moved along a drive axis of a spindle drive by the drive and which comprises a slot track in which a guide pin is configured to move, the movement of the guide pin along the slot track being configured to move the at least one environmental sensor from the retracted position into the deployed position. The kinematic mechanism comprises a guide lever which is connected to the roof module, in particular to a support structure and/or a frame structure and/or another body component, in a rotatable manner at one end and connected to the at least one environmental sensor in a rotatable manner at its other end, and the guide pin is disposed on the guide lever in a fixed manner, the kinematic mechanism comprising a control lever which is connected to the roof module, in particular a support component of the roof module or another body component, in a rotatable manner at one end and connected to the at least one environmental sensor, in particular a housing of the environmental sensor, in a rotatable manner at its other end.

The external force can be a wind force or a similar load, for example, which acts on the at least one environmental sensor from outside of the vehicle when the at least one environmental sensor is in the deployed state. For example, a force acting on the environmental sensor can cause the environmental sensor to be subjected to a torque about at least one suspension point on the roof module (or a frame structure of the roof module), said torque pushing the environmental sensor back in the direction of the retracted position. However, a torque of this kind is deflected via one or more components by means of the kinematic system according to the invention in such a manner that the environmental sensor stays fixed in the deployed position and thus cannot be pushed back in the direction of the retracted position. In other words, one advantage of the kinematic system according to the invention is that it enables a best possible fixation of the end position at least in the deployed state. With this fixation, different (movement) tolerances of the environmental sensor can be observed and a sensor view angle can be (permanently) stabilized during the operation of the environmental sensor. Additionally, the fixation of the environmental sensor according to the invention offers protection against damage (e.g., from sudden snapping shut of the sensor due to external forces) at least with regard to the deployed position. Moreover, vibrations that could lead to interference signals in the evaluation of the environmental sensor signals are avoided and aerodynamic effects on the evaluation become negligible. The phrasing "at least one environmental sensor" means that the roof module can comprise one or more environmental sensors.

According to the invention, the stabilization of the environmental sensor at least in the deployed position is achieved by the fact that the guide lever is fixed to the roof module in a rotatable manner on one side and is coupled to the slide in a movable manner on the other side. The environmental sensor is prevented from sliding back by the self-locking effect of the slide on the spindle of the spindle drive. As long as the drive is not actuated, the slide will not move along the spindle. Thus, the guide pin fixed to the guide lever does not move in the guide slot, either. Hence, forces caused by an external wind pressure load acting on the environmental sensor can be deflected to the bearing of the guide lever on the roof module, in particular to a support component of the roof module, via the guide lever.

Consequently, the environmental sensor stays fixed in the deployed position even if external forces act on it. The slide preferably comprises a through-hole thread by which it engages the spindle and is guided thereon in a movable manner and in particular linearly or translationally. The slide is preferably self-locking when the drive is not actuated.

The kinematic system according to the invention exhibits a certain degree of wear since the environmental sensor is preferably moved by at least one, preferably multiple, inter-related rotation(s) about at least one, particularly preferably multiple, rotation point(s). Rotations of this kind are also less sensitive to dirt compared to linear displacement, which is advantageous in particular with regard to the achievable lifetime. Also, the kinematic system according to the invention has a reduced risk of an unintended occurrence of noise, such as squeaking or another clamping noise. Noises of this kind often occur because of wear. Overall, a stable and robust kinematic system can be provided according to the invention.

The roof module according to the invention can form a structural unit in which features for autonomous or semi-autonomous driving assisted by driver assistance systems are integrated and which can be attached on top of a vehicle shell as a unit by the vehicle manufacturer. Furthermore, the roof module according to the invention can be realized as an entirely solid roof or also as a roof having a roof opening system. Moreover, the roof module can be configured for use in a passenger vehicle or in a utility vehicle. The roof module can preferably be provided as a structural unit in the form of a roof sensor module (RSM) in which the environmental sensors are provided so as to be inserted into a roof frame of a vehicle body as a suppliable structural unit.

The environmental sensor according to the invention can basically be configured in various ways and can in particular comprise a lidar sensor, a radar sensor, an optical sensor, such as a camera, and/or the like. For example, lidar sensors operate in a wavelength range of 905 nm or also of about 1550 nm. The material of the roof skin in a see-through portion, through which the environmental sensor looks while detecting the vehicle environment, should be transparent to the wavelength range used by the environmental sensor and be selected as a function of the wavelength range(s) used by the environmental sensor.

In a preferred embodiment according to the first aspect, the kinematic system has a guide lever, one end (in a longitudinal direction of the guide lever) of which is preferably connected to the roof module (in the form of a fixed bearing) in a rotatable manner.

In a preferred embodiment of the first aspect and according to the second aspect, the kinematic system comprises a slide which is movable along a drive axis (i.e., translationally) by means of the drive and which comprises a guide slot in which a guide pin is movable (preferably in a sliding manner), the environmental sensor being displaceable from the retracted position into the deployed position by the (translational) movement of said guide pin along the guide slot. The slide is preferably guided on a linear path (e.g., similar to a rail). The guide slot is preferably a predefined slot in the slide whose shape and length can map an intended path of movement. It is particularly preferred if the guide slot comprises two essentially parallel slot portions and a ramp-shaped slot portion (having a ramp-shaped gradient). Other shapes of the guide slots are also possible in principle. It is also preferred if the two parallel slot portions (one of which is preferably disposed at a lower end and the other one is preferably disposed at an upper end of the ramp-shaped slot portion) each form a stop for the guide pin. One advantage of a guide slot control is that it permits a speed-optimized displacement of the environmental sensor while requiring little installation space for the adjustment mechanism. The first stop (at a lower end of the guide slot) fixes the environmental sensor in the retracted position (when the guide pin is in the stop position). The second stop (at an upper end of the guide slot) fixes the environmental sensor in the deployed position (when the guide pin is in the stop position). The guide pin is preferably secured against dropping out of the guide slot (by means of a protruding bead (similar to a rivet) or a split pin, for example).

According to the second aspect, the kinematic system comprises a spindle drive having the slide which can move along the drive axis on which the guide lever which enables the environmental sensor to be moved from the retracted position into the deployed position is disposed. The spindle drive allows a linear movement of the slide on the drive spindle along the drive axis to be translated into a (complex) translational and/or rotational movement of the environmental sensor. During the linear movement along the drive axis, the slide preferably does not rotate about the drive axis relative to the spindle rod. In the case at hand, the slide preferably replaces a spindle nut as used in classic spindle drives.

In a preferred embodiment of the first aspect, the drive comprises a motor having a drive pinion on which a helical cable connected to the slide is disposed, for example. In a preferred embodiment according to the second aspect, the drive comprises a motor having a drive pinion which is preferably coupled to the spindle of the spindle drive in a movable manner. The drive can also be coupled directly to the spindle. In this case, the spindle can form an output shaft of the drive, for example.

The motor is preferably an electric motor. The provision of the helical cable, which translates a (rotational) movement of the motor into a linear movement of the slide via the pinion, ensures a high degree of design freedom since the drive can be placed freely in almost any way laterally next to the environmental sensor in an installation space of the roof module extending in the vehicle width direction. Particularly preferably, the drive is configured to move the slide back and forth along an essentially linear path by means of the helical cable. So the slide is preferably essentially moved along a vehicle width direction (if the environmental sensor including the drive is disposed in the vehicle width direction) or a longitudinal vehicle direction (if the environmental sensor including the drive is disposed in the longitudinal vehicle direction) by means of the helical cable. The phrasing "essentially linear path" means that the slide is preferably movable along one axis of movement (i.e. translationally) only (e.g., parallel to the vehicle width direction) but is limited in its movement along the other two axes of movement (except for a constructively required play being provided)(i.e., the slide has only one degree of freedom of movement).

In a preferred embodiment according to the first aspect, the guide pin is disposed on the guide lever in a fixed manner, and one end of the guide lever is preferably connected to the roof module in a rotatable manner. So in this embodiment, one end of the guide lever is preferably connected to the roof module or a component of the drive attached to the roof module in the form of a fixed bearing. In this embodiment, the drive is preferably again realized as a slide including the guide slot described above. The slide preferably moves along a guide path. A profile on which one side of the guide lever is mounted in the form of a fixed bearing in a rotatable manner can be provided on the guide path, for example. In this embodiment, the guide pin is not attached to the environmental sensor in a fixed (immobile) manner but (preferably directly) to the guide lever in a central portion of the guide lever, for example, when viewed in a longitudinal extension of the guide lever. Furthermore, the guide pin is guided in the guide slot in a movable manner, allowing a movement of the slide along the guide path to be transmitted to the guide pin as described above. This movement can be transmitted to the guide lever since the guide pin is fixed relative to the guide lever. Thus, induced by the guide pin, the guide lever can execute a rotation about the axis of rotation of the fixed bearing.

In a preferred embodiment according to the first aspect, the guide lever and at least one cross lever form a cross lever assembly, two lever ends of the cross lever assembly being connected to the environmental sensor (or a housing of the environmental sensor) in a rotatable manner. The two lever ends connected to the environmental sensor (or a housing of the environmental sensor) preferably serve to stabilize the environmental sensor at least relative to a vertical and/or a horizontal by means of two preferably spaced-apart pivots. In this embodiment, the environmental sensor preferably undergoes an essentially vertical movement during the retracting and/or deploying movement. Thus, the environmental sensor preferably does not rotate about an axis of rotation. The cross lever assembly preferably comprises at least four levers (the guide levers and three cross levers). The guide lever and a first cross lever are preferably connected to each other in a rotatable manner in respective central portions relative to their longitudinal extension and cross each other in this way. A preferred second cross lever is preferably connected to an end of the first cross lever. A preferred third cross lever is preferably connected to an end of the guide lever opposite the fixed end of the guide lever. The second and the third cross lever are preferably connected to each other in a rotatable manner in respective central portions relative to their longitudinal extension and cross each other in this way. The other end of the preferred second cross lever is preferably connected to the environmental sensor in a rotatable manner. The other end of the preferred third cross lever is preferably connected to the environmental sensor in a rotatable manner.

In a preferred embodiment according to the first aspect, the kinematic system comprises a control lever, a first stabilizing lever and a second stabilizing lever. The control lever is preferably connected to the first and the second stabilizing lever in a rotatable manner. The guide lever is preferably connected to the first stabilizing lever in a rotatable manner. The first and the second stabilizing lever are preferably connected to the environmental sensor (or a housing of the environmental sensor) in a rotatable manner. The first and the second stabilizing lever thus form preferably spaced-apart pivots on the environmental sensor (or a housing of the environmental sensor) with the result that a movement of the environmental sensor relative to at least two axes of movement is limited by means of the first and the second stabilizing lever. This embodiment thus preferably forms a 7-join linkage which forms the adjustment mechanism of the environmental sensor. In this embodiment, the slide described above including the guide slot preferably serves as the drive. In this embodiment, the environmental sensor is fixed in the retracted position and in the deployed position by means of the slot end portions of the guide slot with the result that the environmental sensor cannot be moved by an external force in either case and can only be moved by actuation of the drive.

In a preferred embodiment according to the first aspect, the guide pin is disposed on the environmental sensor or a housing of the environmental sensor in a fixed manner. In this configuration, the environmental sensor is preferably mounted on the roof module (or a frame structure of the roof module) in a rotatable manner by means of a suspension on the housing of the environmental sensor, for example. The environmental sensor can preferably rotate about a single axis of rotation and is otherwise fixed relative to the roof module. This configuration allows a relative movement of the slide along the (linear) axis of movement, for example, to be translated into a rotation of the environmental sensor about the axis of rotation through a sliding of the guide pin in the guide slot since the guide pin is fixed to a housing of the environmental sensor, for example, in such a manner that it is immobile relative to the environmental sensor. Hence, the guide pin slides from the first (lower) stop along the ramp-shaped guide slot in the direction of the second stop, thereby changing its relative distance from the axis of movement of the slide fixed relative to the roof module when viewed in a vertical direction, until the guide pin strikes the second stop and the environmental sensor has reached the deployed position.

In a preferred embodiment according to the first aspect, the kinematic system comprises a spindle drive having a spindle nut movable along a drive axis, at least one tilting lever by means of which the environmental sensor can be moved from the retracted position into the deployed position being disposed on the spindle nut in a movable manner. The spindle drive offers an alternative to a movement induction by means of the slide described above, through which a linear movement of a spindle nut on a spindle along the drive axis can also be translated into a (complex) translational and/or rotational movement of the environmental sensor. The tilting lever is preferably fixed to the spindle in such a manner that it can rotate about a single axis of rotation. The spindle nut preferably does not rotate about the drive axis during the linear movement along the drive axis relative to the spindle.

In a preferred embodiment according to the first aspect, the kinematic system comprises a guide rail having a guide groove in which a sliding pin disposed on the environmental sensor in a fixed manner can move. Particularly preferably, the guide groove is essentially straight. "Essentially straight" means that the guide groove extends in a mostly straight line along its longitudinal extension but can also have a slight angle from the straight line in individual sections of the guide groove. The guide rail serves in particular to limit the mobility of the environmental sensor in terms of a degree of freedom (e.g., a tilt about an axis parallel to a longitudinal vehicle direction) during the movement from the retracted position into the deployed position. To this end, it is particularly preferred if a second sliding pin is disposed on the environmental sensor in a fixed manner and is held in the guide groove in a mobile manner. The second sliding pin is preferably fixed to the environmental sensor (or a housing of the environmental sensor) at a distance from the first sliding pin. This stabilizes the freedom of movement of the environmental sensor and prevents undesired tilting, for example.

In a preferred embodiment according to the first aspect, when the environmental sensor is in the deployed position, the at least one tilting lever is oriented essentially orthogonally (i.e., at 90°±10%) to the drive axis in terms of its longitudinal extension, thus fixing the environmental sensor in the deployed position. When the environmental sensor is in the retracted position on the other hand, the tilting lever is preferably oriented essentially parallel to the drive axis in terms of its longitudinal extension according to this embodiment. The tilting lever can preferably be connected to the spindle nut in a rotatable manner on one side. Moreover, the tilting lever can preferably be (preferably directly) connected to the guide lever mounted on the roof module (or a roof frame structure of the roof module) in a rotatable manner on one side in the form of a fixed bearing. Preferably, another end of the guide lever is mounted on the environmental sensor (or its housing) in a rotatable manner. A movement of the spindle nut along the spindle axis is transmitted to the guide lever via the tilting lever. Starting from a retracted position of the environmental sensor, in which the tilting lever is preferably oriented parallel to the drive axis, the tilting lever tilts about an axis of rotation. Said tilting is preferably transmitted to the guide lever. Since the latter is fixed to the roof module in the form of a fixed bearing on one side, the tilting of the tilting lever is transmitted to the environmental sensor via the guide lever, and the environmental sensor is moved from the retracted position into the deployed position. If an external force acts on the environmental sensor when it is in the deployed position, the external force is deflected because of the orthogonal position of the tilting lever relative to the drive axis in such a manner that the environmental sensor stays fixed in the deployed position. In the retracted position, the spindle nut preferably strikes a stop of the spindle drive with the result that the environmental sensor is fixed in the retracted position at least unidirectionally along the drive axis and cannot be moved further in the direction of the retracted position by a (external) force. So the spindle nut is preferably located in the stop position unidirectionally along the drive axis when the environmental sensor is in the retracted position.

In a preferred embodiment according to the first aspect, the at least one tilting lever is directly or indirectly connected to the guide lever in a rotatable manner. The guide lever can also be connected to the tilting lever indirectly via one or more other levers, for example, an operative connection through which a movement can be effectively transmitted being established.

In a preferred embodiment according to the first aspect, the tilting lever is connected to a second locking lever element in a rotatable manner. In this embodiment, the environmental sensor is thus fixed in the retracted position and in the deployed position by means of the locking lever assembly or by means of the first and the second locking lever element. In this embodiment, the kinematic system particularly preferably comprises another element, in particular a resilient and/or force-applying element, such as a weather-strip assembly on the housing, in addition to the locking lever assembly. In a preferred embodiment, the locking lever assembly comprises at least two locking lever elements by means of which the environmental sensor can be fixed in the retracted position and in the deployed position with the result that the environmental sensor cannot be moved by an external force in either case. So the locking lever assembly preferably changes a lever position of the at least two locking lever elements or lever elements together with the at least one displacement lever in such a manner that the environmental sensor can be fixed both in the retracted position and in the deployed position. To this end, the at least two locking lever elements of the locking lever assembly are preferably moved into a straight-angle position or an over-center position (i.e., the end position of maximum deployment), in which multiple hinge points of the locking lever assembly are situated in a straight line, when the environmental sensor is in the deployed position, so that an external force acting on the environmental sensor is deflected into the roof module preferably orthogonally to the drive axis of the drive via the locking lever assembly, the environmental sensor thus not being caused to move. In other words, the locking lever assembly enables moving past the over-center position in order to prevent unlocking, which could happen because of external forces in a position before the over-center position. In particular, the preferred weather-strip assembly prevents swinging back from the straight-angle position due to external forces since the weather-strip assembly preferably applies a force, in particular a kind of restoring force, to the kinematic system. Particularly preferably, the weather-strip assembly is provided in an over-center space. At least one end stop against which the locking lever assembly of the kinematic system preferably pushes is preferably provided in the over-center space. This preferably allows the kinematic system to move into a defined end position.

In a preferred embodiment, the tilting lever comprises a first and a second tilting lever arm. The first tilting lever arm is preferably connected to the spindle nut in such a manner that it can rotate about an axis of rotation. The first tilting lever arm is preferably connected to the second tilting lever arm in such a manner that it can rotate about an axis of rotation relative thereto. The second tilting lever arm is preferably connected to the locking lever assembly in a rotatable manner or preferably forms one of the three locking lever elements of the locking lever assembly itself.

In a preferred embodiment according to the first and/or the second aspect, one end of the guide lever is connected to the roof module, preferably in the form of a fixed bearing, in such a manner that it can rotate about an axis of rotation. At its other end, the guide lever is preferably connected to the environmental sensor (or a housing of the environmental sensor) in such a manner that it can rotate about an axis of rotation. According to the first aspect, the guide lever is preferably merely coupled to the rest of the lever assembly of this embodiment via a connecting lever, i.e., it interacts with the latter only indirectly. According to the second aspect, the guide lever is preferably not coupled to the control lever but spaced apart therefrom. The guide lever, in particular together with the connecting lever and/or the control lever, serves to move the environmental sensor from the retracted position into the deployed position after (in particular indirect) force introduction through the tilting levers and/or the drive. So the guide lever causes the environmental sensor to move in the vertical direction and preferably to rotate. According to the second aspect, the control lever also moves a rear part of the environmental sensor from the retracted position into the deployed position. According to the second aspect, both levers preferably undergo a purely rotational movement about their respective bearing points to move the environmental sensor, said rotational movement being preferably translated, however, into a complex translational/rotational movement of the environmental sensor.

According to the first aspect, the guide lever is particularly preferably connected to the locking lever assembly in a rotatable manner via the connecting lever. Preferably, the connecting lever engages the guide lever in a first third (in the longitudinal direction from a connection point of the guide lever with the roof module) along a longitudinal extension of the guide lever. The connecting lever preferably serves as a connecting element to a locking lever element of the locking lever assembly. Via said locking lever element, the connecting lever is in turn operatively connected to one of the tilting lever arms.

In a preferred embodiment according to the first aspect, the kinematic system preferably comprises a first stabilizing lever, a second stabilizing lever and/or a third stabilizing lever. The first stabilizing lever is preferably connected to the roof module (or a frame structure of the roof module) in a rotatable manner at one end, preferably in the form of a fixed bearing. At its other end, the first stabilizing lever is preferably connected to the third stabilizing lever in a rotatable manner (about an axis of rotation). The second stabilizing lever is connected to the roof module (or a frame structure of the roof module) in a rotatable manner at one end, preferably in the form of a fixed bearing. At its other end, the second stabilizing lever is connected to the third stabilizing lever in a rotatable manner. The third stabilizing lever is preferably connected to the second stabilizing layer in a rotatable manner at one end. At its other end, the third stabilizing lever is preferably connected to the environmental sensor in a rotatable manner. This lever assembly and the control lever, the at least one tilting lever and the locking lever assembly together preferably form a 7-joint linkage by means of which the adjustment mechanism of the environmental sensor is realized. This 7-joint linkage allows a complex sequence of movements of the environmental sensor to be realized in a space-saving and installation space-saving manner.

In a preferred embodiment according to the first aspect, the locking lever assembly is connected to the roof module and/or a roof module frame and/or a support component attached to the roof module or the roof module frame in a rotatable manner via a fixed bearing. The tilting lever is connected to the spindle nut in a rotatable manner at one end and connected to a second locking lever element of the locking lever assembly in a rotatable manner at its opposite end. The second locking lever element of the locking lever assembly is connected in a rotatable manner to one end of a first locking lever element, which is connected to the environmental sensor and/or a housing, in which the environmental sensor is disposed, in a rotatable manner at its opposite end. According to the invention, the environmental sensor is particularly preferably moved between the retracted position and the deployed position in a guided manner via a pair of main links disposed in particular to the right and to the left of the environmental sensor (with respect to a line of sight of the environmental sensor). The environmental sensor is preferably disposed in a housing or a sensor housing which is mounted in a rotatable manner on the panel component and/or a roof module frame or another support structure of the roof module, in particular via the guide lever. The environmental sensor preferably undergoes a rotation about an axis of rotation when it is moved between the retracted position and the deployed position. Particularly preferably, the two main links, which can comprise a plurality of levers according to the invention, each lock the environmental sensor in the two end positions so that the latter is nearly unmovable by an external force. It is noted that minimal movement between the over-center position and the straight-angle position is possible due to external forces, for example, in some embodiments. For example, a common rotation point of the locking lever elements and/or the lever elements can be located outside of the actual straight-angle line. However, the movement of the environmental sensor is negligible, meaning the effect according to the invention can be achieved, i.e., the environmental sensor cannot be moved by an external force at least in the deployed position. So the locking preferably takes place by means of an over-center position according to the invention. A lever of the main link associated with the support structure is preferably driven by a linear drive having a spindle nut and is connected to the spindle nut in a rotatable manner via a coupling link. The spindle nut can preferably be moved in both directions along a spindle axis up to respective end stops. The end stops preferably define respective end positions (the retracted position and the deployed position). The linear drive is preferably self-locking and thus additionally locks the kinematic system and with it the environmental sensor in the given end position. According to the invention, the kinematic system has been optimized in terms of an insensitivity to tolerances. This enables the environmental sensor to move into a repeatably exact or accurate position, especially in one operating position, i.e., the deployed position. Particularly preferably, the pair of main links is connected by a torsion bar; most preferably, at least part of the pair of main links is even a one-piece component. As a consequence, movement between the right and the left main link, and therefore movement of the kinematic system, is synchronized.

In a preferred embodiment according to any one of the aspects according to the invention, the environmental sensor comprises a housing with which it is disposed in an opening of the roof skin or of the panel component in a retractable and deployable manner. Furthermore, a weather-strip assembly surrounding the opening is provided, the weather-strip assembly being configured to prevent moisture from entering the opening and to generate a pre-load force relative to the kinematic system, which fixes the environmental sensor at least in the deployed position. According to the invention, the environmental sensor or a housing of the environmental sensor comprises a circumferential seal, such as a ring collar seal, through which a pre-load force can be introduced into the kinematic system as evenly as possible. As an alternative or an addition to the seal, at least one stop which holds the environmental sensor in a given end position can be provided on the housing. Such a stop can be a profile on the housing, for example. A stop in the retracted position can be provided by a housing lid, for example. The housing lid is preferably flush with the surrounding panel component when the environmental sensor is in the retracted position. Such a stop preferably strikes the panel component itself, or a support structure disposed on the panel component, or a roof module frame.

In a preferred embodiment according to at least one of the aspects according to the invention, the weather-strip assembly is configured to prevent the entry of moisture at least in the retracted position and in the at least one deployed position. The housing has such a shape that it is in moisture-proof contact with the weather-strip assembly at least in the retracted position and in the at least one deployed position. To this end, the housing can comprise at least one curved and/or slanted wall portion, for example, which makes it possible for the wall portion in question to also be in contact with the weather-strip assembly during the retracting movement and the deploying movement.

Particularly preferably, the kinematic system is configured to move the housing in such a manner between the retracted position and the at least one deployed position that respective mating weather-strip portions or stops of the housing are in moisture-proof contact with the weather-strip assembly in the retracted position and in the at least one deployed position. To this end, the lever assembly is preferably configured in such a manner that the housing can be in contact with the weather-strip assembly during the retracting movement and the deploying movement.

In a preferred embodiment according to at least one of the aspects according to the invention, the respective mating weather-strip portions are formed integrally on the housing. Alternatively or additionally, the respective mating weather-strip portions or stops are each disposed on the housing as an additional installed component.

In a preferred embodiment according to the second aspect, the control lever is connected to a support component of the roof module in a rotatable and stationary manner and/or connected to a housing of the environmental sensor in a rotatable manner. Preferably, the guide lever is also connected to a support component of the roof module in a rotatable and stationary manner and/or connected to a housing of the environmental sensor in a rotatable manner.

In a preferred embodiment according to the second aspect, the guide lever is disposed on the roof module and/or on the housing in such a manner that it is spaced apart from the control lever. So the two levers preferably do not have any common bearing points. Instead, all bearing points are preferably spaced apart from each other.

In a preferred embodiment, the guide lever and the control lever are connected to the roof module in a rotatable manner in different bearing points, in particular in spaced-apart bearing points, at their respective ends. In a preferred embodiment, the guide lever and the control lever are connected to the housing of the environmental sensor in a rotatable manner in different bearing points, in particular in spaced-apart bearing points, at their respective ends.

Basically any type of environmental sensor can be installed in the roof module. The use of lidar sensors and/or radar sensors and/or camera sensors and/or multi-camera sensors is particularly advantageous.

Of course, the embodiments and configuration examples mentioned above and to be explained below can be realized both individually and in any combination with each other without departing from the scope of the present invention. Moreover, all embodiments and configuration examples of the roof module fully relate to a motor vehicle having such a roof module.

BRIEF DESCRIPTIONS OF THE DRAWINGS

An embodiment of the invention is schematically illustrated in the drawing and will be explained as an example below.

Figure 6:
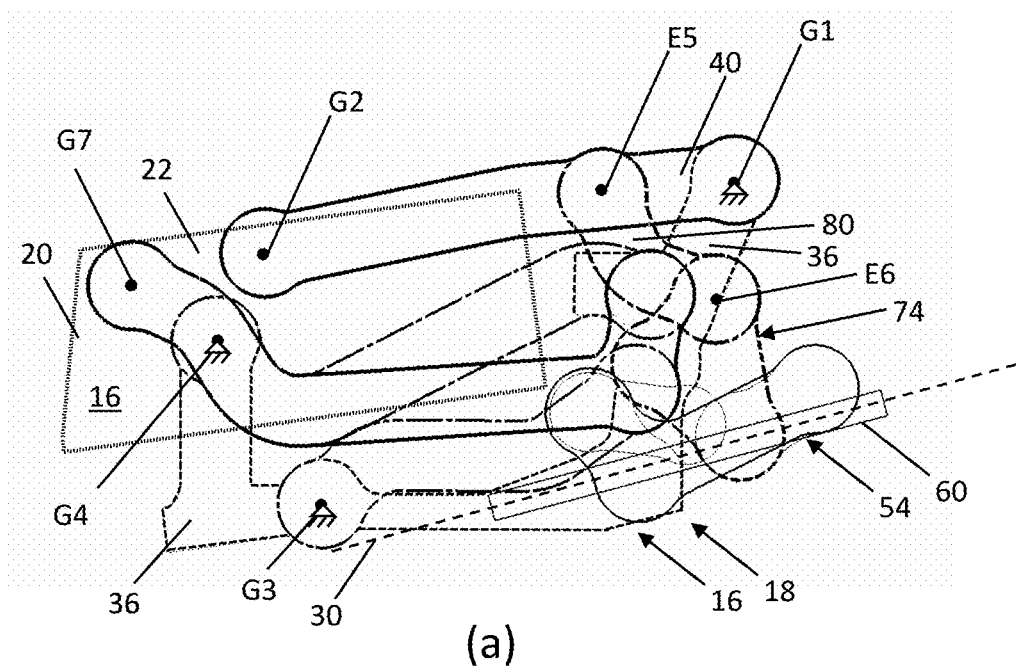
Figure 6:
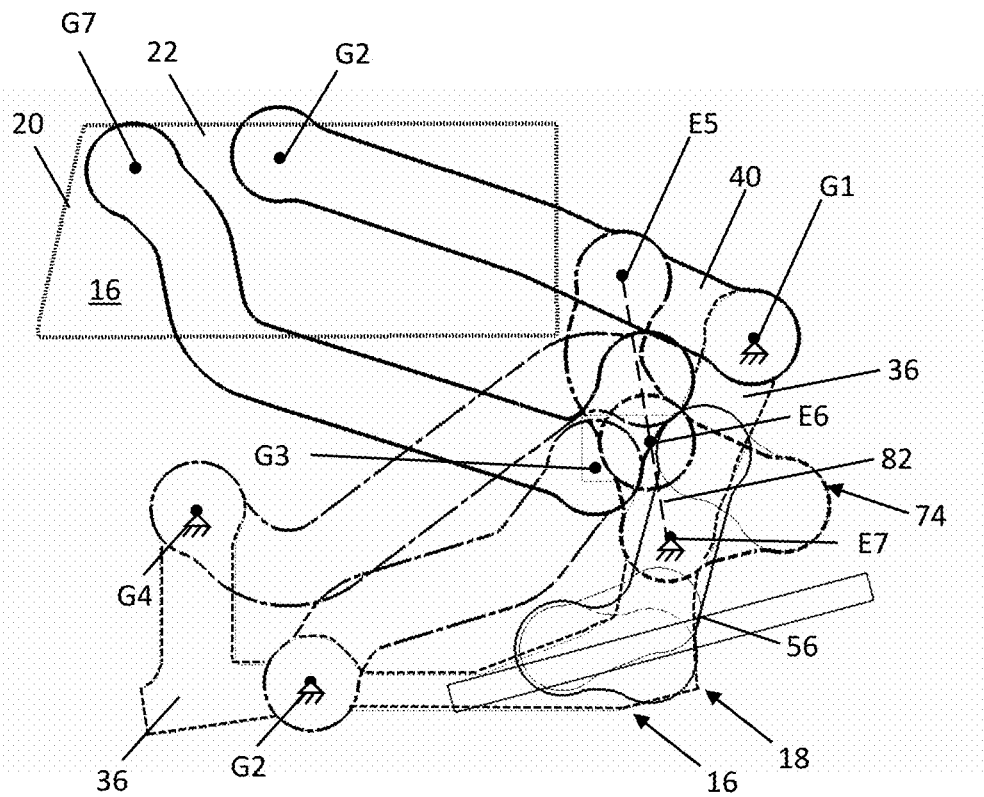
Figure 6:
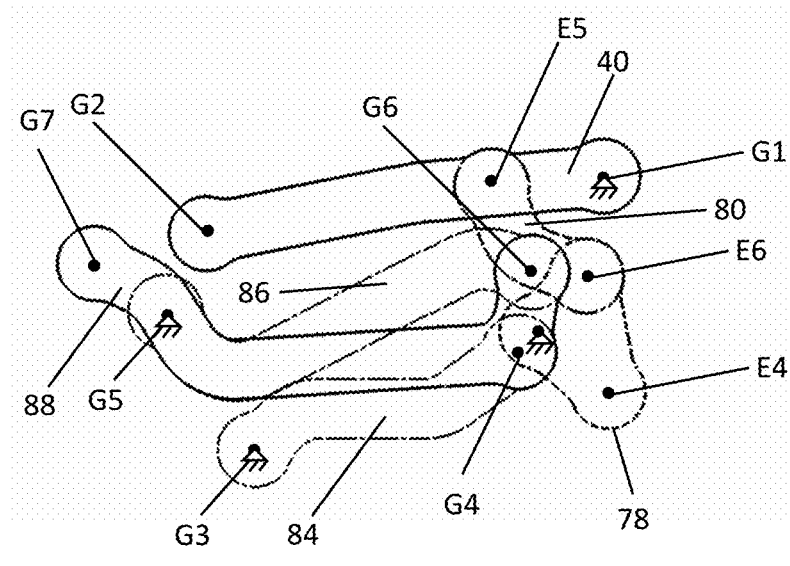
Figure 6:
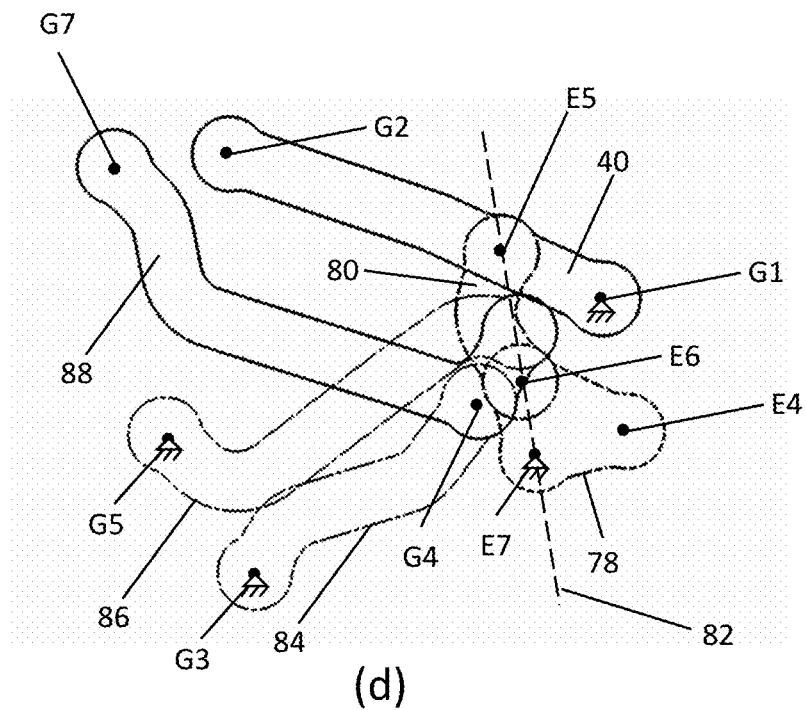
Figure 6:
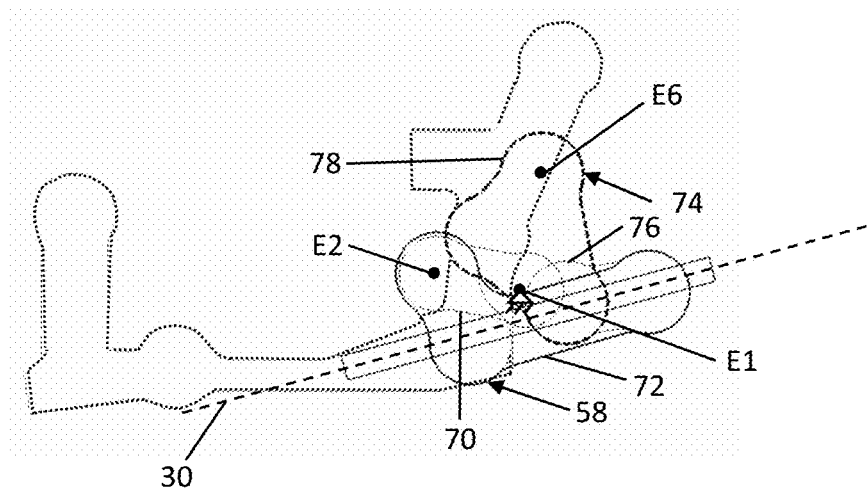
Figure 6:
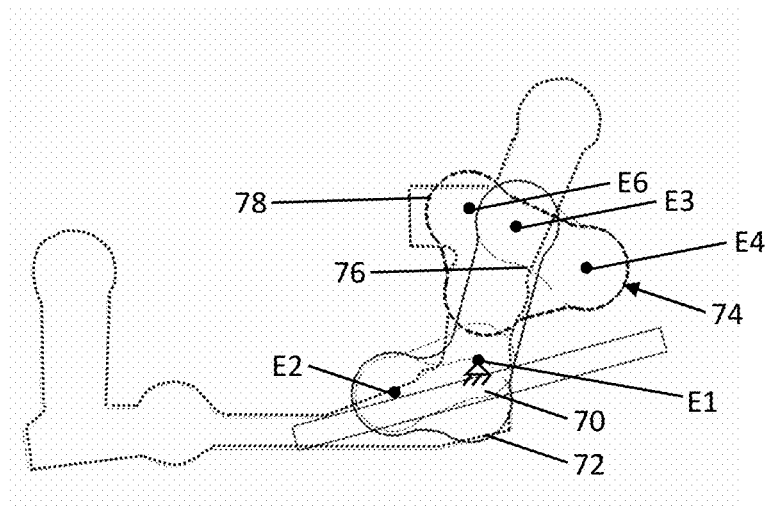
Figure 7:
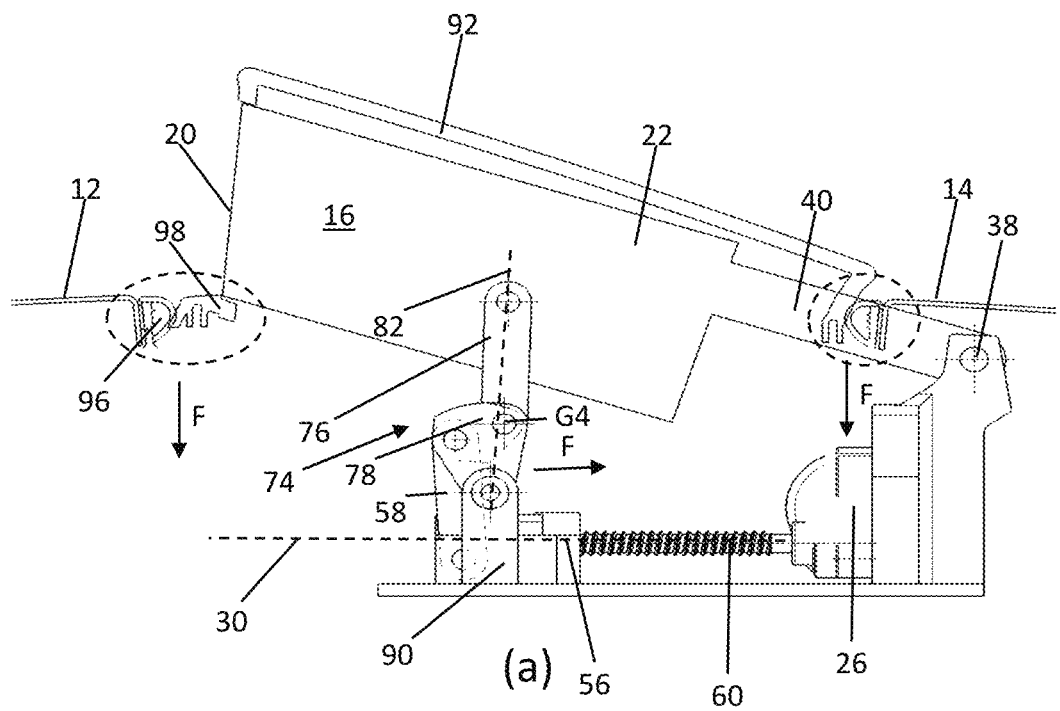
Figure 7:
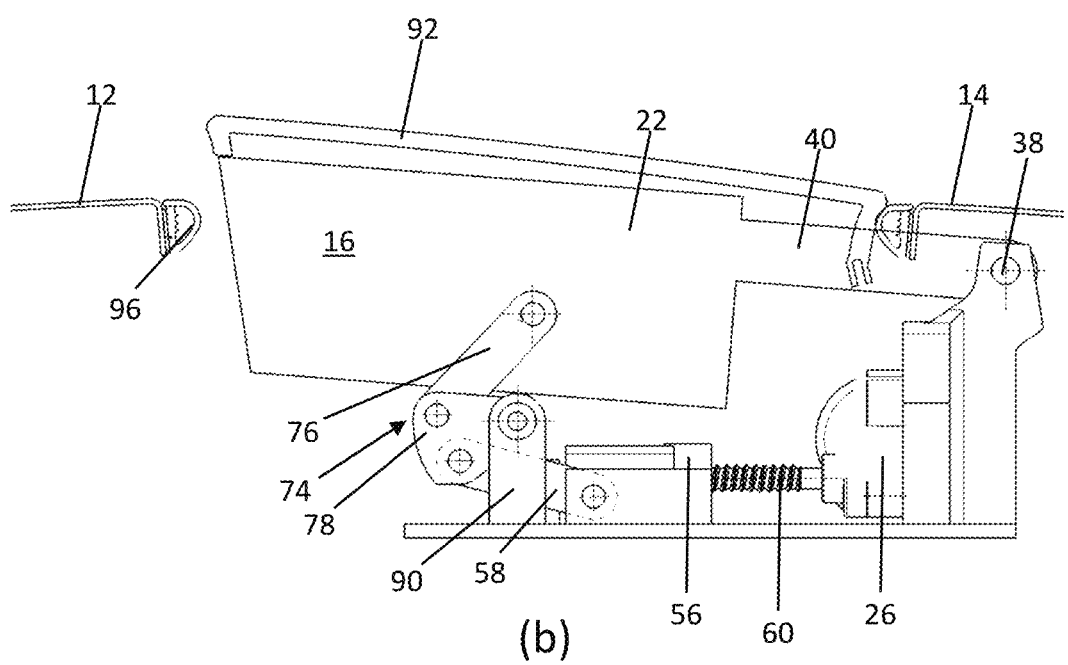
Figure 7:
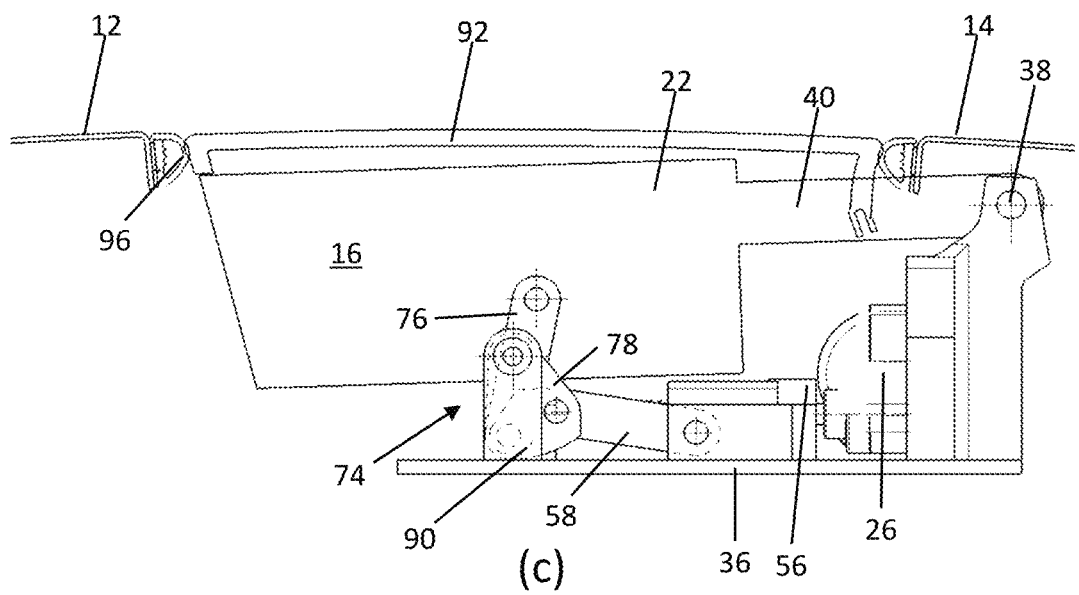
Figure 8:
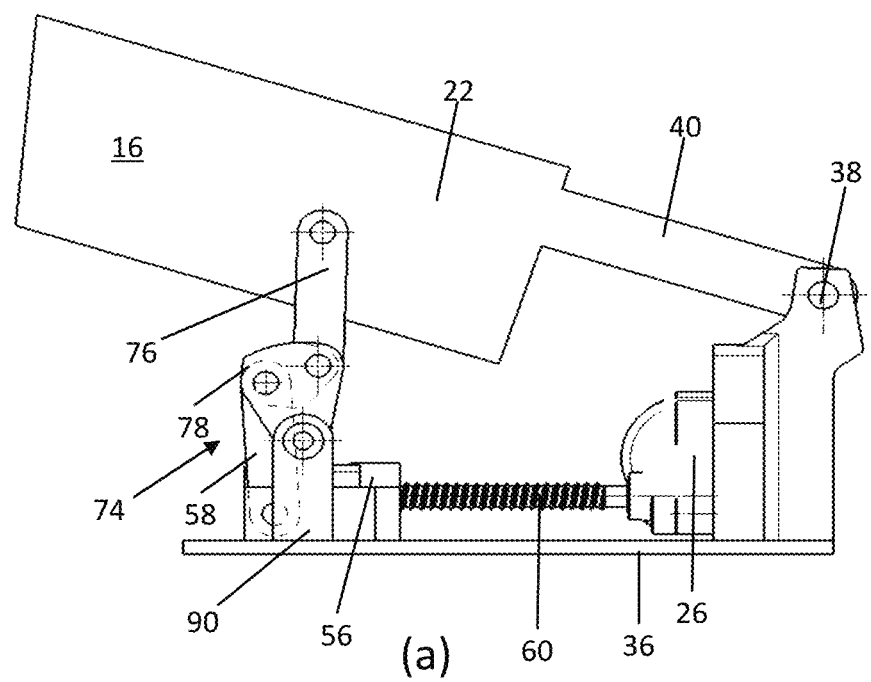
Figure 8:
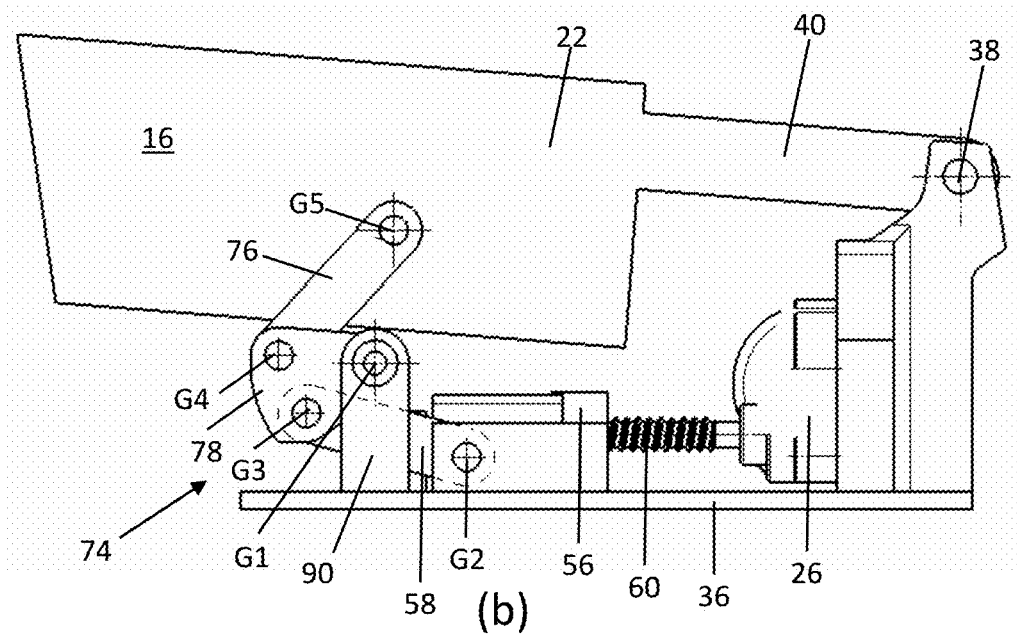
Figure 8:
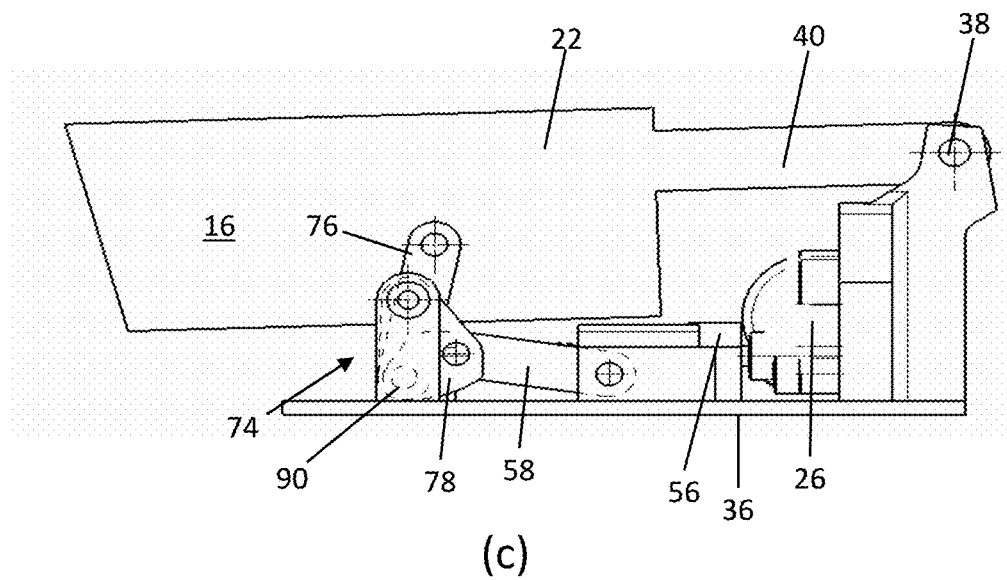
Figure 9:
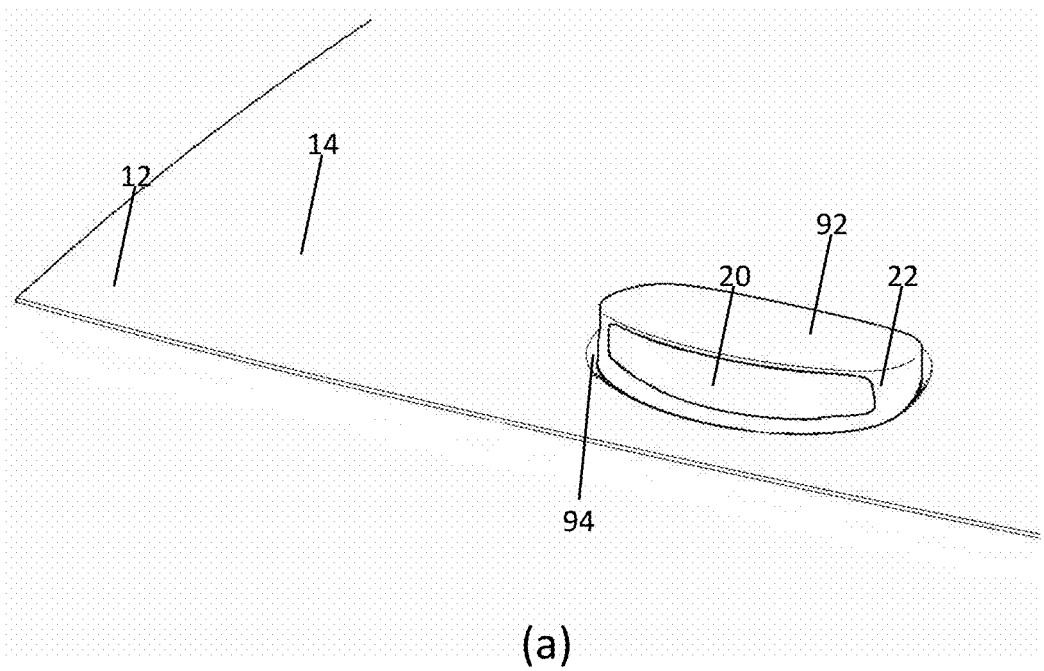
Figure 9:
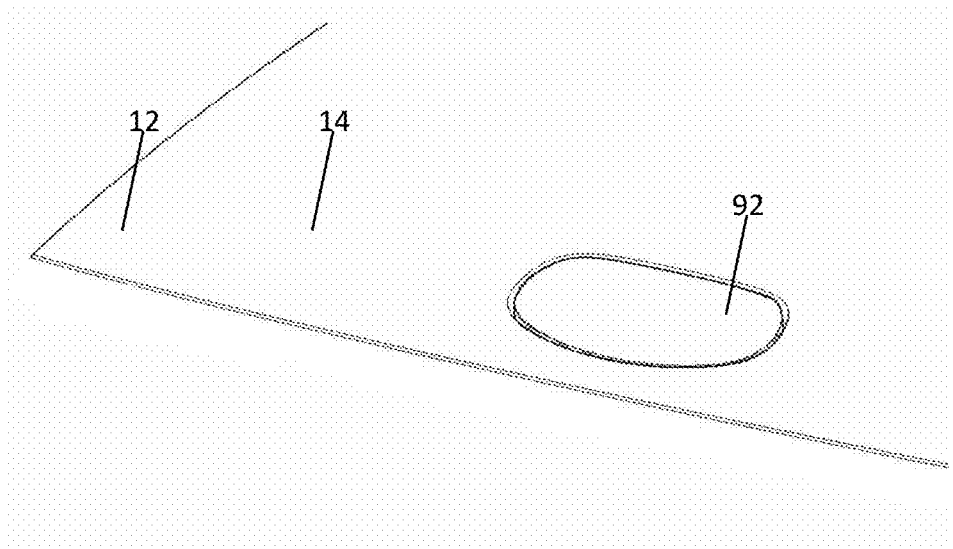
Figure 10:
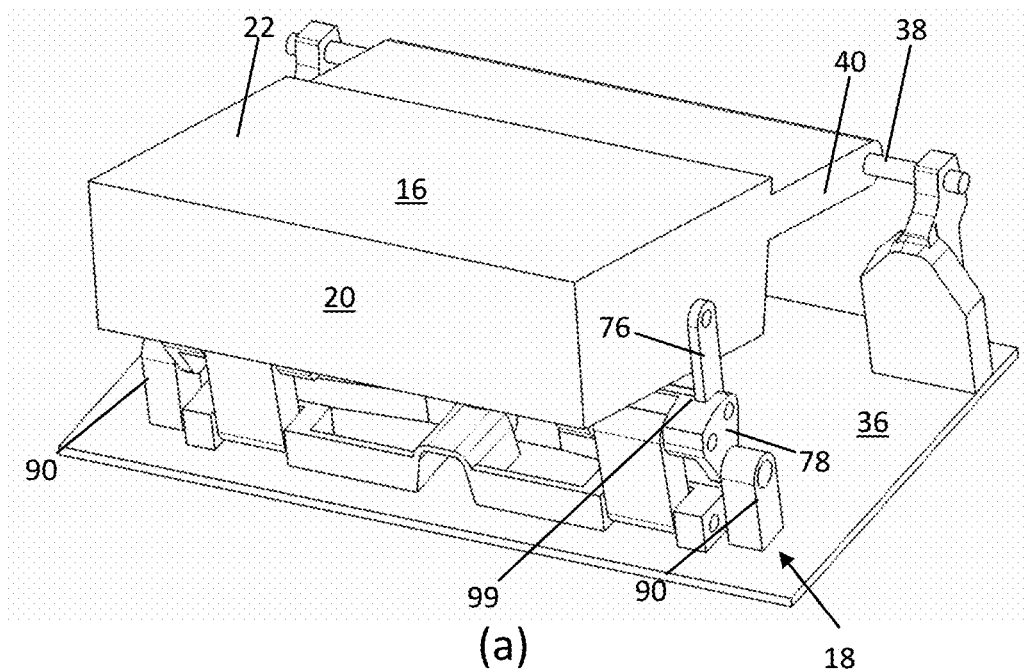
Figure 10:
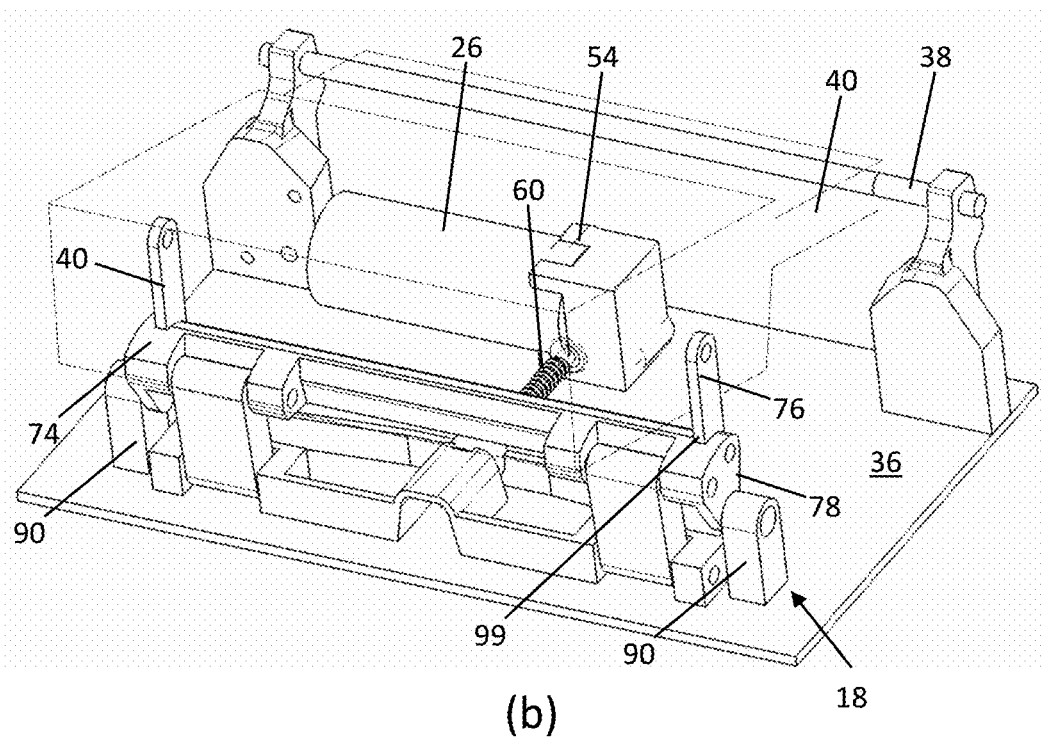
Figure 11:
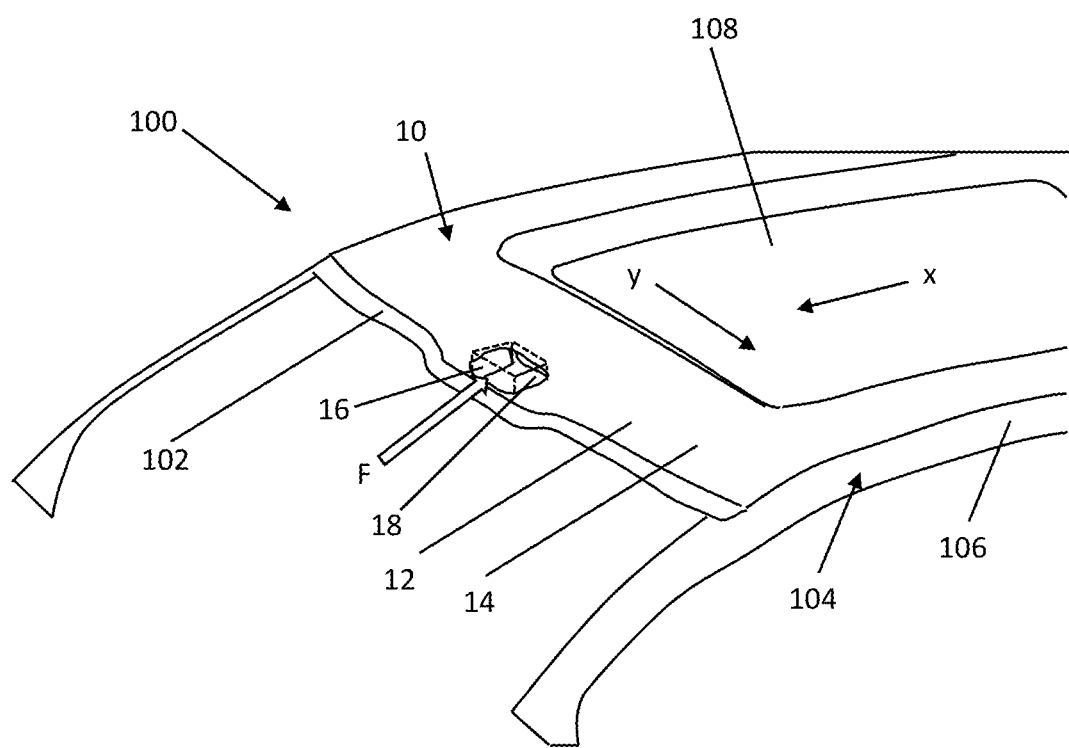
Figure 12:
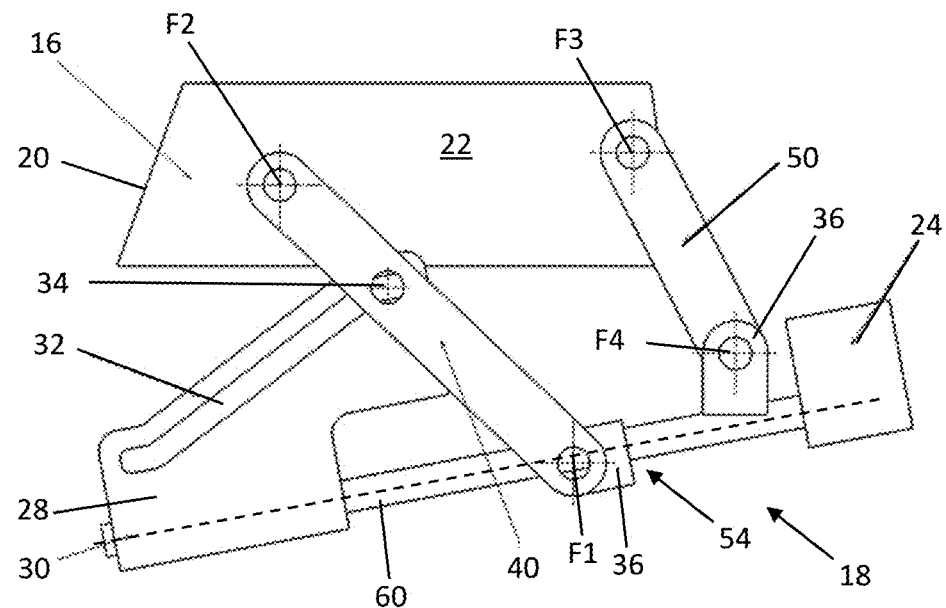
Figure 13:
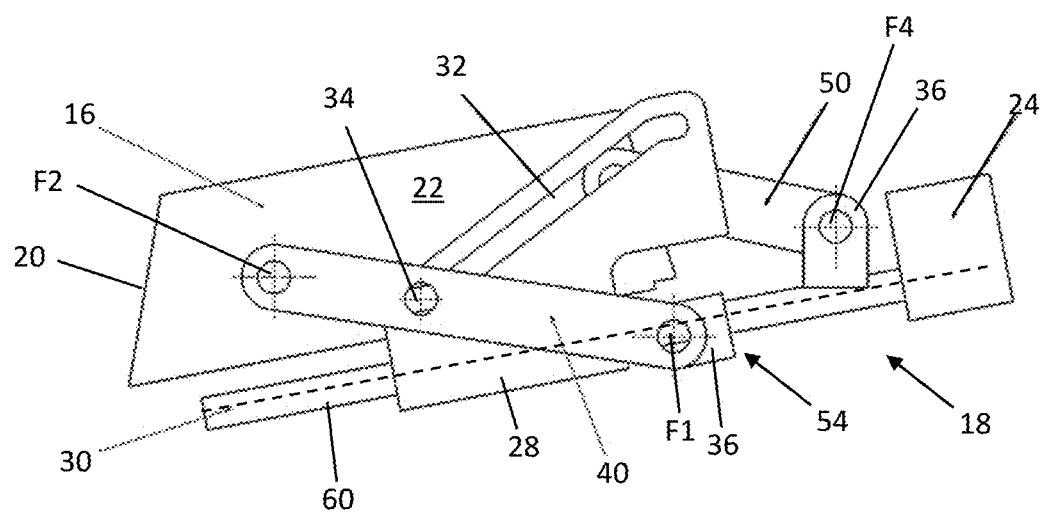
Figure 14:
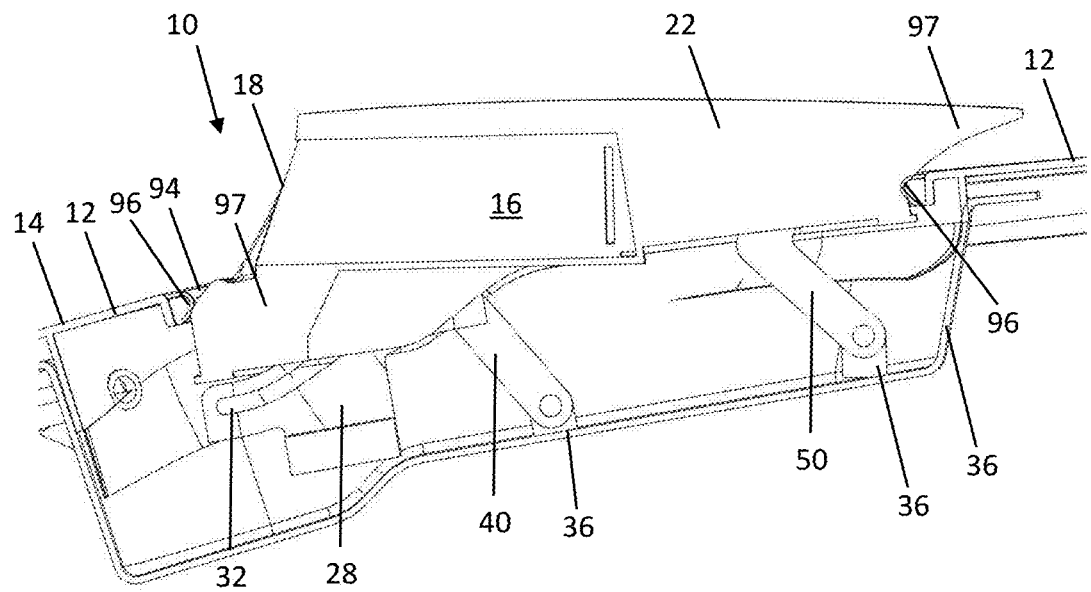
Figure 15:
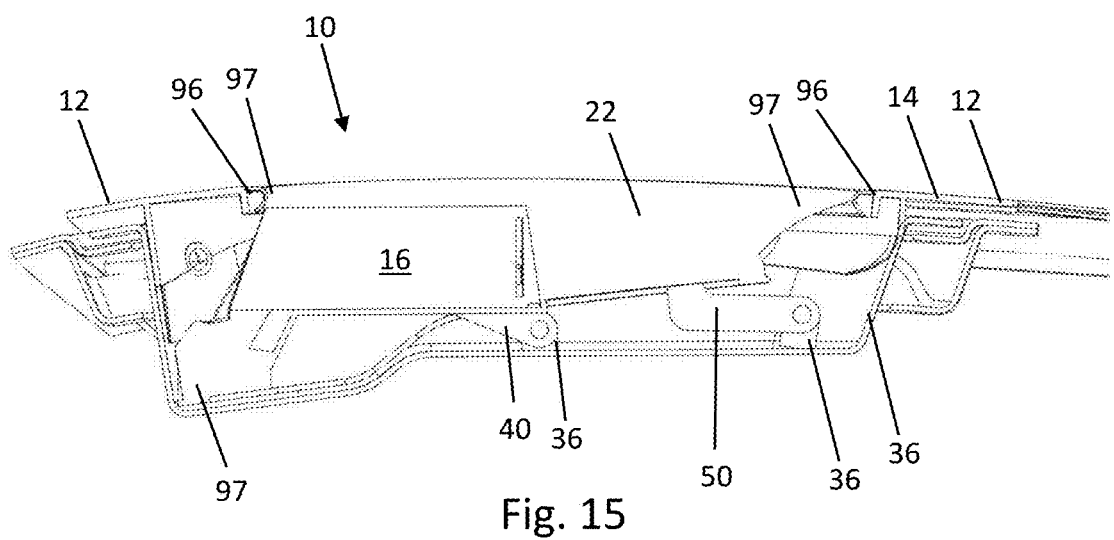
Figure 16:
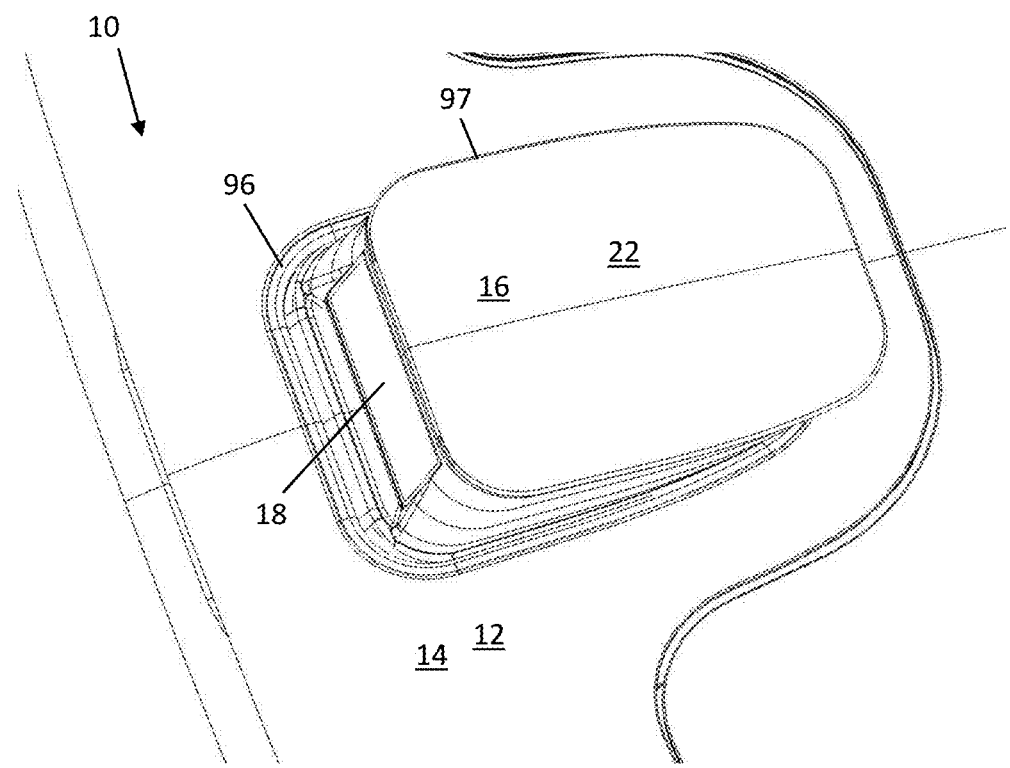

FIG. 6 shows a fifth configuration example of a kinematic system according to the invention with the environmental sensor in a retracted position (a), with the environmental sensor in a deployed position (b), in an isolated view of a lever assembly in the retracted position (c), an isolated view of the lever assembly in the deployed position (d), an isolated view of a locking lever assembly in the retracted position (e) and an isolated view of the locking lever assembly in the deployed position (f);

FIG. 7 shows a sixth configuration example of a kinematic system according to the invention with the environmental sensor in a deployed position (a), with the environmental sensor in an intermediate position (b) and with the environmental sensor in a retracted position (c);

FIG. 8 shows a seventh configuration example of a kinematic system according to the invention with the environmental sensor in a deployed position (a), with the environmental sensor in an intermediate position (b) and with the environmental sensor in a retracted position (c);

FIG. 9 is a schematic view of an eighth configuration example of a kinematic system according to the invention with the environmental sensor in a deployed position (a) and with the environmental sensor in a retracted position (b);

FIG. 10 is a schematic view of a ninth configuration example of a kinematic system according to the invention including a sensor housing (a) and without the sensor housing (b);

FIG. 11 is a perspective view of a vehicle roof comprising a roof module according to the invention;

FIG. 12 shows a configuration example of a kinematic system according to the invention with the environmental sensor in a deployed position;

FIG. 13 shows the configuration example of the kinematic system according to the invention with the environmental sensor in a retracted position;

FIG. 14 shows another configuration example of the roof module according to the invention;

FIG. 15 shows another configuration example of the roof module according to the invention; and FIG. 16 shows another configuration example of the roof module according to the invention.

DETAILED DESCRIPTION

Figure 1:
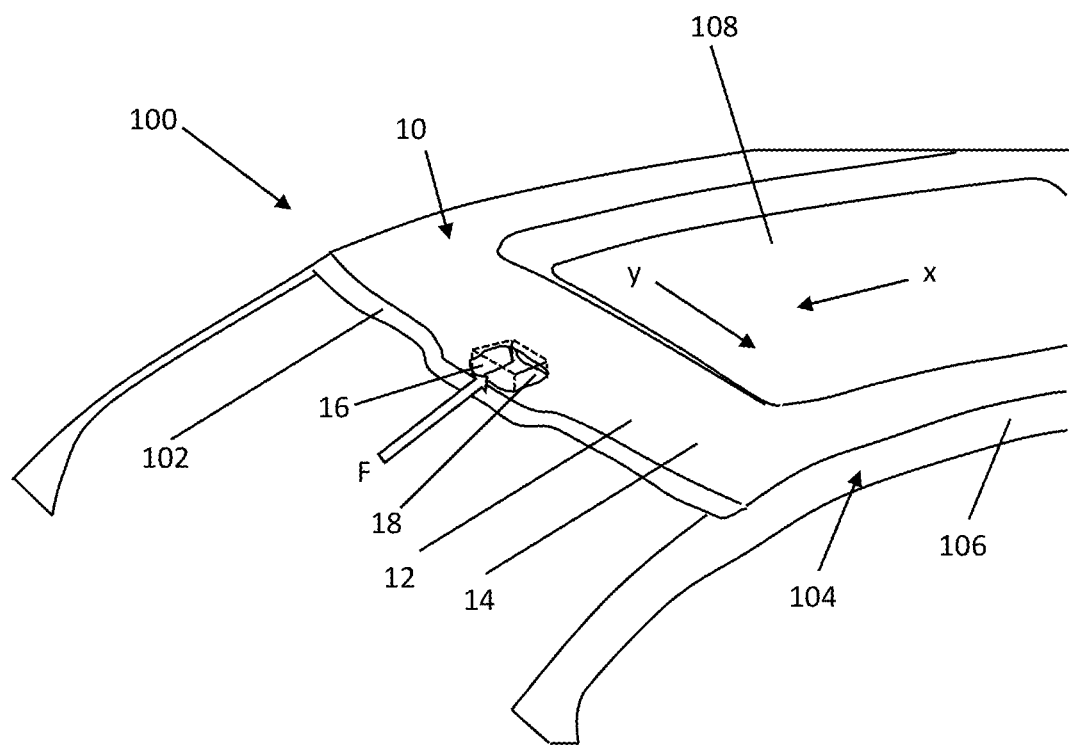
FIG. 1 is a perspective view of a vehicle roof comprising a roof module according to the invention.

FIG. 1 shows a vehicle roof 100 of a vehicle comprising a roof module 10. Roof module 10 comprises a panel component 12 for forming roof skin 14 of vehicle roof 100 of the vehicle (not shown entirely). An environmental sensor 16 (a lidar sensor in the case at hand) is disposed in a front center roof portion of vehicle roof 100, i.e., of roof module 10, in a longitudinal vehicle direction x. Other sensor types, such as (multidirectional) cameras and/or ultrasonic sensors and/or the like, can also be used.

Environmental sensor 16 is disposed directly behind a front transverse beam 102, which defines a front header of the roof of the vehicle. Roof module 10 further comprises a kinematic system 18. Kinematic system 18 allows environmental sensor 16 to be moved from a retracted position into a deployed position, in which environmental sensor 16 at least partially protrudes beyond roof skin 14, and furthermore to fix environmental sensor 16 at least in the deployed position in such a manner that environmental sensor 16 cannot be moved by an external force F. Force F can be an air resistance force acting on environmental sensor 16 in the deployed position, for example. Alternatively or additionally, it can also be an air force or another external force, for example.

Roof module 10 is preferably inserted into a roof frame 104 of the vehicle or placed on the at least two transverse beams 102 and at least two longitudinal beams 106, which form roof frame 104, as a structural unit. In the configuration example shown, roof module 10 has a panoramic roof 108.

Figure 2:
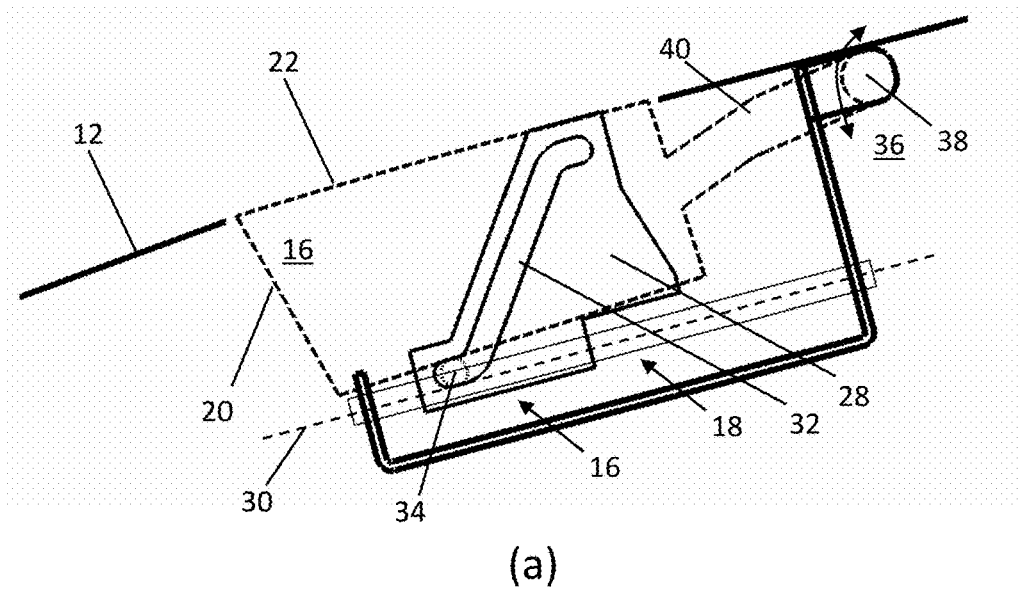
FIG. 2 shows a first configuration example of a kinematic system according to the invention with the environmental sensor in a retracted position (a), an intermediate position (b) and a deployed position (c)
Figure 2:
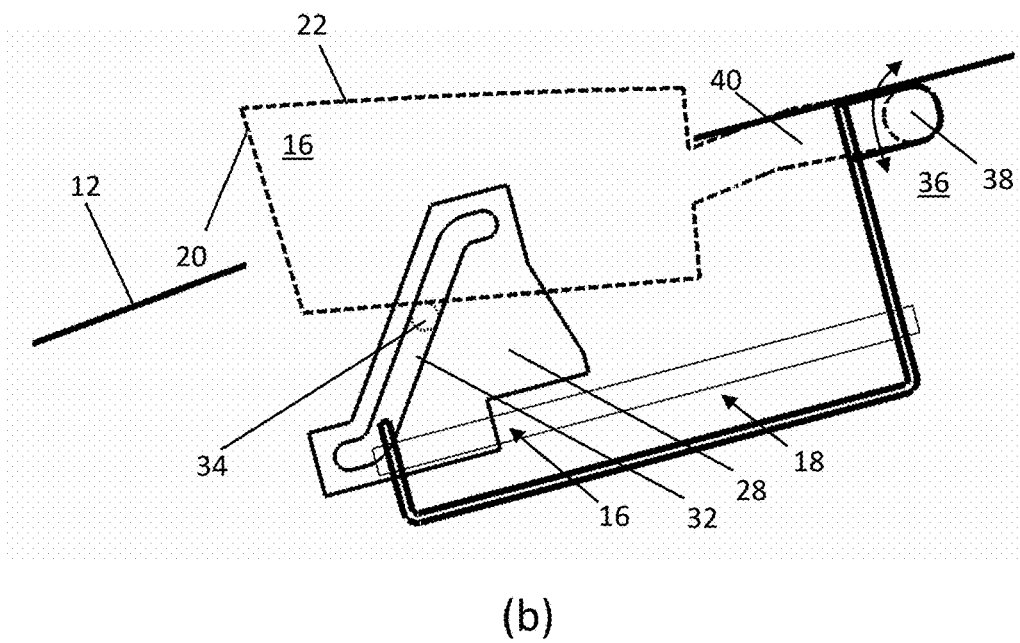
Figure 2:
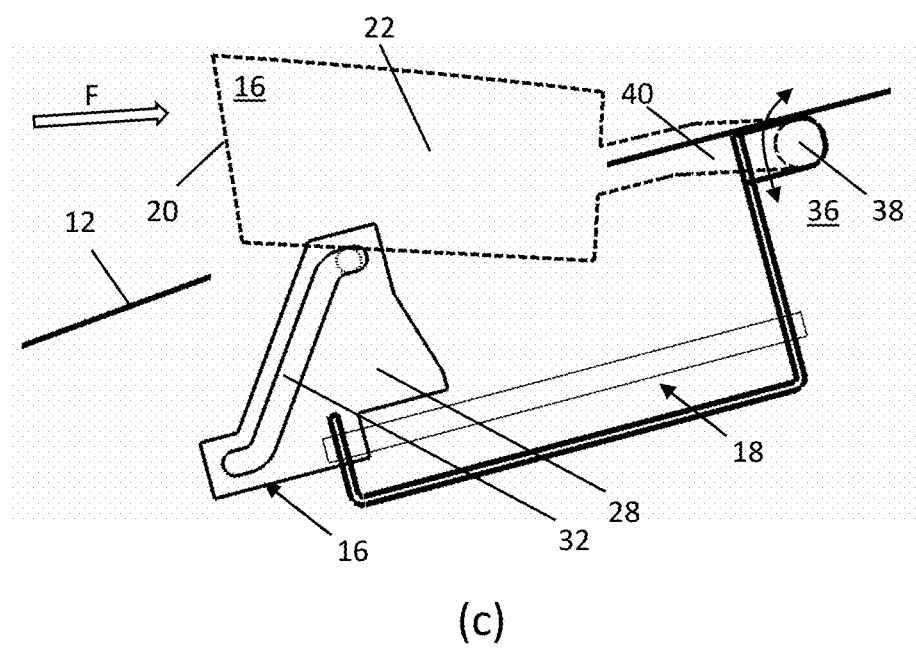

FIG. 2 shows a configuration example of kinematic system 18 according to the invention including environmental sensor 16 with environmental sensor 16 in the retracted position (see FIG. 2(a)), an intermediate position (i.e., between the retracted position and the deployed position) (see FIG. 2(b)), and the deployed position (see FIG. 2(c)). Environmental sensor 16 comprises a see-through portion 20, which can be made of a preferably shatter-proof plastic or another (semi-)transparent material. Furthermore, environmental sensor 16 comprises a housing 22.

Kinematic system 18 comprises a drive 24, which is illustrated schematically in each of the figures at hand. Drive 24 can be an electric drive or another type of actuator, for example. Drive 24 can interact with an actuator 26 comprised by kinematic system 18 in order to move environmental sensor 16.

Figure 3:
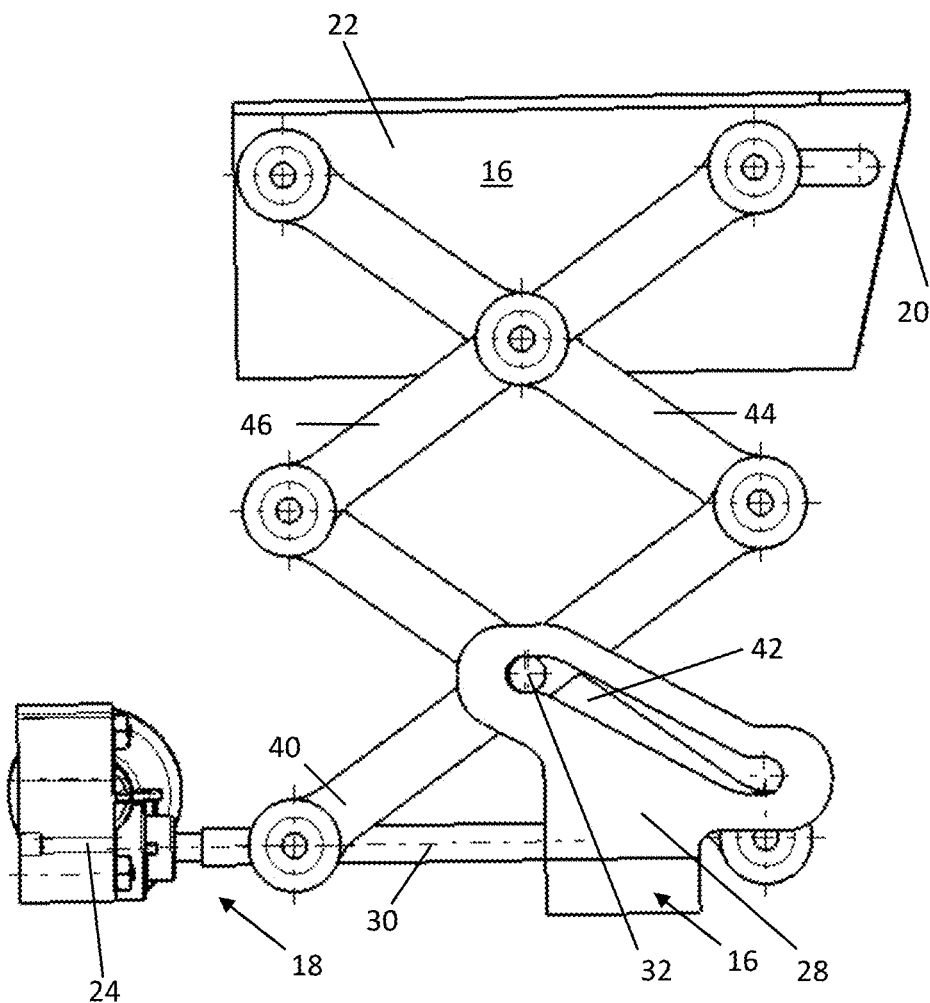
FIG. 3 shows a second configuration example of a kinematic system according to the invention with the environmental sensor in a deployed position.
Figure 4:
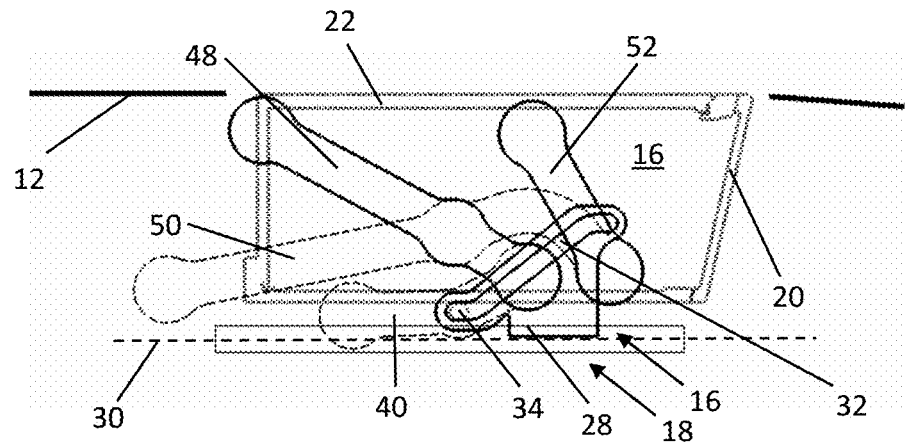
FIG. 4 shows a third configuration example of a kinematic system according to the invention with the environmental sensor in a retracted position (a), an intermediate position (b) and a deployed position (c); a schematic perspective view of the kinematic system (d)
Figure 4:
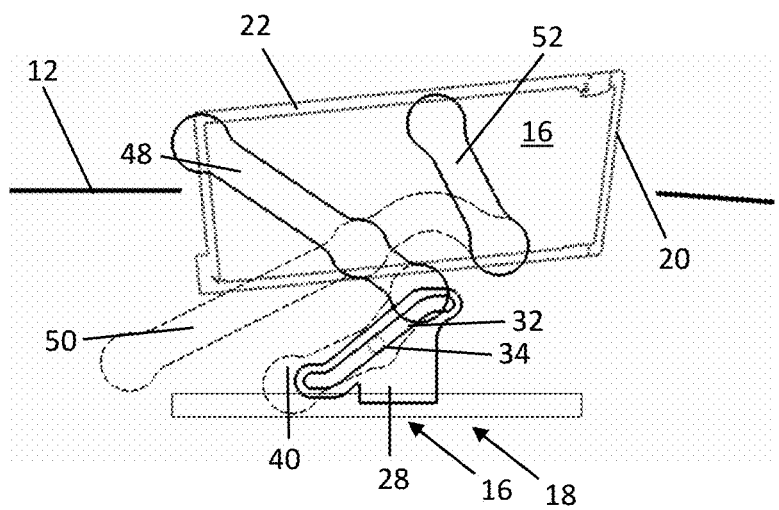
Figure 4:
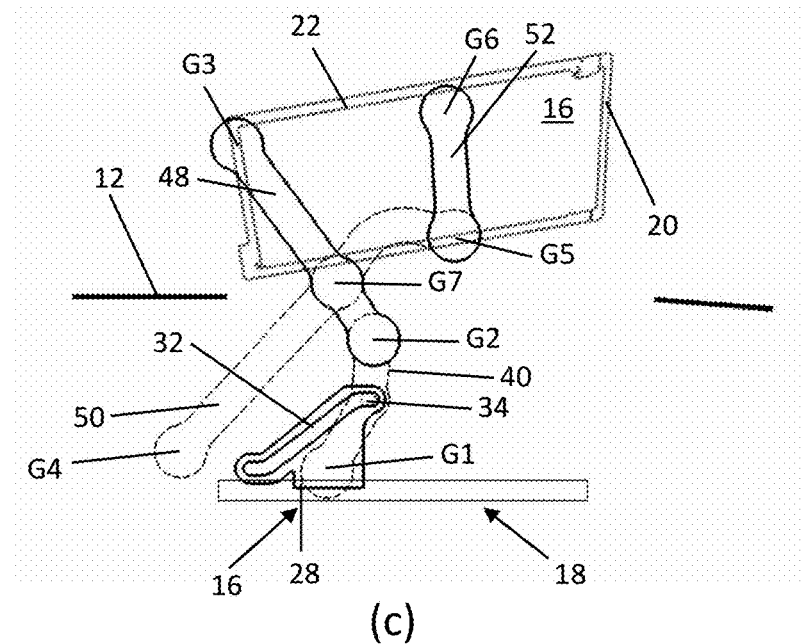
Figure 4:
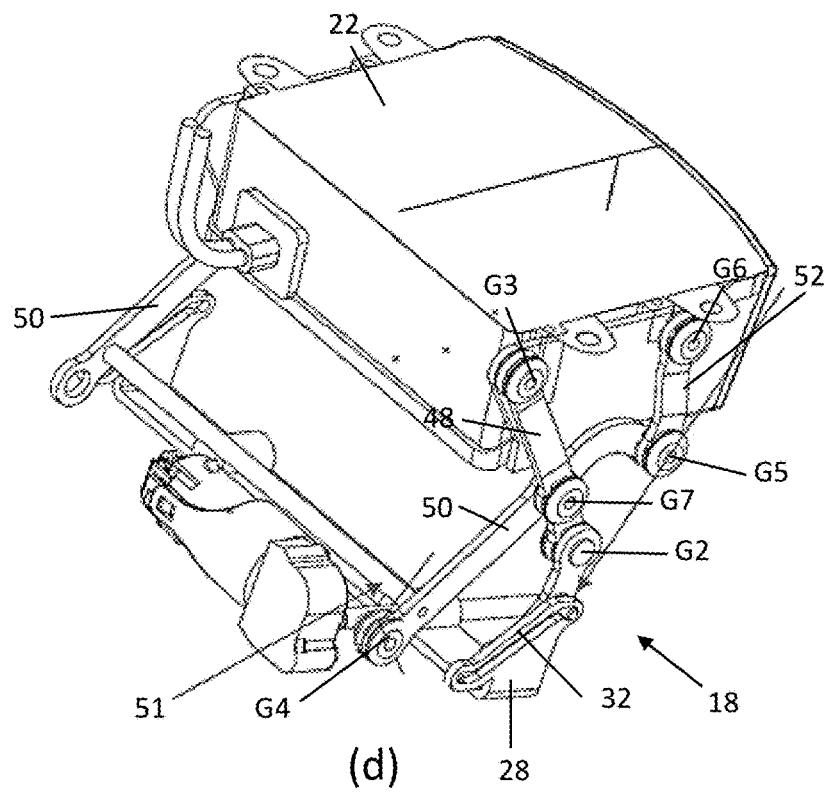

Actuator 26 can be a slide 28, for example, which can be moved along a drive axis 30 by means of drive 24 (see FIGS. 2 to 4). Drive 24 can be connected to slide 28 via a helical cable (not shown), for example, in order to linearly move slide 28 back and forth along drive axis 30 (see FIGS. 2(a), 3 and 4(a)). Slide 28 comprises a guide slot 32, in which a guide pin 34 is disposed in a movable manner. Guide pin 34 is movable relative to drive axis 30 in a vertical direction only and is preferably limited in terms of the other two degrees of freedom of linear movement. The movement of guide pin 34 along guide slot 32 is induced by a relative movement of slide 28 along drive axis 30. A movement of guide pin 34 along guide slot 32 displaces environmental sensor 16 from the retracted position into the deployed position (and vice-versa). Guide pin 34 moves along guide slot 32 between a lower first stop of guide slot 32 and an upper second stop of guide slot 32. Between the first and second stops, guide slot 32 is ramp-shaped, i.e., it has an angle of inclination relative to drive axis 30. The lower first stop fixes environmental sensor 16 in the retracted position with the result that environmental sensor 16 cannot be moved by an external force F (see FIGS. 2(a) and 4(a)). The upper second stop fixes environmental sensor 16 in the deployed position with the result that environmental sensor 16 cannot be moved by an external force F (see FIGS. 2(c), 3 and 4(c)). In FIGS. 2(b) and 4(b), guide pin 34 is located in an approximately central slot portion along the ramp-shaped portion of guide slot 32, environmental sensor 16 being located in the intermediate position when guide pin 34 is in this position on guide slot 32.

As can be seen in FIGS. 2(a) to 2(c), guide pin 34 can preferably be directly attached to (or supported on) environmental sensor 16 or housing 22. In this case, guide pin 34 is immobile relative to environmental sensor 16. Thus, a movement of guide pin 34 along guide slot 32 is transmitted directly to environmental sensor 16. In this configuration example, environmental sensor 16 can be mounted on a frame structure 36 of roof module 10 in the form of a fixed bearing in such a manner that it can rotate about an axis of rotation 38 by means of a projection formed on housing 22 (in the form of a guide lever 40), for example. Since environmental sensor 16 is mounted in a fixed manner, which limits its freedom of movement in two degrees of freedom of linear movement, the movement of guide pin 34 along guide slot 32 is translated into a rotation of environmental sensor 16 about axis of rotation 38, which means that environmental sensor 16 can be moved from the retracted position into the deployed position.

Alternatively to a fixed arrangement of guide pin 34 directly on environmental sensor 16 or its housing 22, guide pin 34 can also be connected to a guide lever 40 in a fixed manner (see FIGS. 3 and 4(a) to 4(c)). One end of guide lever 40 (in the longitudinal direction of guide lever 40) is preferably connected to roof module 10 or frame structure 36 in a rotatable manner in the form of a fixed bearing in an area in which drive axis 30 extends. The fixed mounting limits the freedom of movement of guide lever 40 in two degrees of freedom of linear movement, which means that guide lever 40 can only rotate about a fixed bearing rotation axis (not shown). Since guide pin 34 is disposed on guide lever 40 in a fixed manner, a movement of guide pin 34 along (the ramp-shaped slot section of) guide slot 32 is transmitted directly to guide lever 40, which rotates about its fixed bearing rotation axis as a result. With regard to the rest of the kinematic system, which is used in combination with the slide drive for displacing environmental sensor 16, there are different options in principle, two preferred configuration examples of which will be explained in more detail with reference to FIGS. 3 and 4 below.

In FIG. 3, guide lever 40 is connected to a first cross lever 42 of a cross lever assembly in a rotatable manner. First cross lever 42 preferably centrally (along its longitudinal extension) engages a center of guide lever 40 (along the longitudinal extension thereof). Guide pin 34 preferably also engages the center of guide lever 40. The two levers 40 and 42 thus form a cross when in an open position. One end of guide lever 40 is connected to roof module 10 in a rotatable manner in the form of a fixed bearing in the area of drive axis 30 of the slide drive. One end of first cross lever 42 is free-standing. The other end of guide lever 40 is connected to an end of second cross lever 44. The other end of first cross lever 42 is connected to an end of a third cross lever 46. Second cross lever 44 is connected to third cross lever 46 in a rotatable manner in a central portion (preferably in the respective center) along the longitudinal extension in each case. The other end of second cross lever 44 is connected to housing 22 of environmental sensor 16. The other end of third cross lever 46 is connected to housing 22 of environmental sensor 16. The two connection points on housing 22 are spaced apart from each other along a horizontal. When guide pin 34 moves long guide slot 32, this movement will be translated into a rotation of guide lever 40 about a fixed joint rotation axis since guide lever 40 is mounted in a fixed manner on one side. The connection to first cross lever 42 and to second and third cross levers 44 and 46 causes the levers to scissor against each other, the respective end portions of levers 40, 42, 44 and 46 moving apart from each other in a vertical direction. Since cross levers 44 and 46 are mounted on environmental sensor 16 at one end, the latter is also moved along the vertical, i.e., it can be moved from the retracted position into the deployed position. Of course, a retraction of environmental sensor 16 works equivalently but in a different direction of movement.

In FIGS. 4(*a*) to 4(*d*), guide lever 40 is connected to roof module 10 or a part of frame structure 36 in a rotatable manner (in the form of a fixed bearing) at one end (i.e. on one end side) in the area of drive axis 30. The figures show a guide slot control with a fixation in the open position and the closed position. This connection forms a first hinge rotation point G1 of kinematic system 18 (see FIG. 4(*c*)). Thus, guide lever 40 can rotate about a fixed bearing rotation axis. At its other end, guide lever 40 is connected to an end of a first stabilizing lever 48 of shown kinematic system 18 in a rotatable manner. This connection forms a second hinge rotation point G2 of kinematic system 18 (see FIG. 4(*c*)). Guide pin 34, which is otherwise held in guide slot 32 of slide 28 in a movable manner, is fixed to guide lever 40 in a central portion of guide lever 40. Guide lever 40 is angled and has two straight sections along a longitudinal extension. At its other end, first stabilizing lever 48 is connected to housing 22 of environmental sensor 16 in a rotatable manner. This connection forms a third hinge rotation point G3 of kinematic system 18 (see FIG. 4(*c*)). Furthermore, kinematic system 18 comprises a control lever 50, which is connected to roof module 10 or a part of frame structure 36 in a rotatable manner (in the form of a fixed bearing) on one end side. As can be seen in FIG. (d), the two guide levers 50 are connected via a torsion bar 51 on the right and on the left. Torsion bar 51 enables movement synchronization between the right and the left side (with respect to the line of sight of environmental sensor 16) of the multi-bar kinematics, i.e., kinematic system 18. This connection forms a fourth hinge rotation point G4 of kinematic system 18 (see FIG. 4(*c*)). One end of control lever 50 is connected to an end of second stabilizing lever 52 in a rotatable manner. This connection forms a fifth hinge rotation point G5 of kinematic system 18 (see FIG. 4(*c*)). At its other end, second stabilizing lever 52 is connected to housing 22 of environmental sensor 16 in a rotatable manner. This connection forms a sixth hinge rotation point G6 of kinematic system 18 (see FIG. 4(*c*)). The two hinge rotation points G3 and G6 are spaced apart from each other on housing 22 of environmental sensor 16 so as to thereby impede a tilting (due to gravity) of housing 22. Along a longitudinal extension, control lever 50 is further connected to first stabilizing lever 48 in a rotatable manner. In the case at hand, this connection point is located at a distance of approx. ⅔ of a length of control lever 50 from hinge rotation point G4 when viewed from hinge rotation point G4 and at a distance of approx. ⅔ of a length of first stabilizing lever 48 from hinge rotation point G3 or to hinge point G3 when viewed from hinge rotation point G3. This connection forms a seventh hinge rotation point G7 of kinematic system 18 (see FIG. 4(*c*)). Thus, kinematic system 18 forms a 7-hinge-point kinematic system.

Starting from the retracted position (see FIG. 4(*a*)), a movement of guide pin 34 along guide slot 32 (from the lower stop to the upper stop of the guide slot) causes guide or control lever 50 to rotate about hinge rotation point or rotation point G4. As a result of the connection to first stabilizing lever 48, this rotation is translated into a rotation about hinge rotation point G2. Since control lever 50 is mounted in hinge rotation point G4 and is connected to first stabilizing lever 48 in hinge rotation point G7, the rotation about hinge rotation point G2 is translated into a vertical movement of hinge rotation point G3 away from drive axis 30, which means that environmental sensor 16 is raised together with housing 22. Since second stabilizing lever 52 is connected to hinge rotation points G5 and G6, a front part of housing 22 of environmental sensor 16 (in the direction of see-through portion 20) is also raised because of second stabilizing lever 52. In this way, entire environmental sensor 16 is moved from the retracted position into the deployed position.

Figure 5:
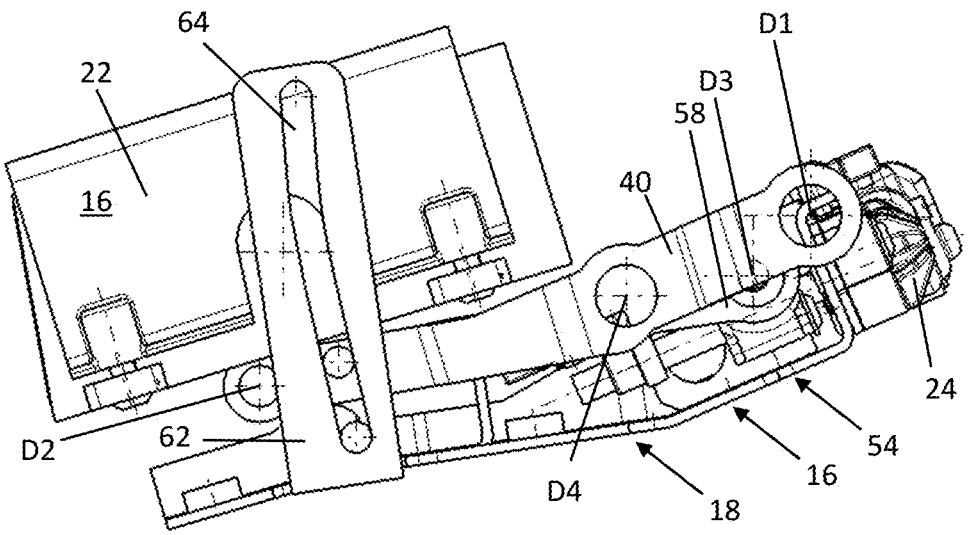
FIG. 5 shows a fourth configuration example of a kinematic system according to the invention with the environmental sensor in a retracted position (a) and a deployed position (b)

An alternative to a slide-based drive of the kinematic system (as the one illustrated in FIGS. 2 to 4) is a spindle drive 54 as the one illustrated in FIGS. 5 and 6, for example. Other drive system not illustrated are also conceivable. Spindle drive 54 comprises a spindle nut 56 movable along drive axis 30 of spindle drive 54. At least one tilting lever 58, by means of which environmental sensor 16 can be moved from the retracted position into the deployed position (see FIG. 5), is disposed on spindle nut 56 in a moveable manner (i.e., in such a manner that it can rotate about an axis of rotation). Spindle nut 56 is preferably movable relative to drive axis 30 in a linear manner only and cannot rotate about drive axis 30. Spindle nut 56 is guided on a spindle 60, which is rotated about drive axis 30 by means of drive 24, for example. With regard to the rest of the kinematic system, which is used in combination with the spindle drive for displacing environmental sensor 16, there are different options in principle, two preferred configuration examples of which will be explained in more detail with reference to FIGS. 5 and 6 below.

FIG. 5 shows environmental sensor 16 in a view from behind in longitudinal vehicle direction x. Drive 24 is disposed on the right laterally next to environmental sensor 16 in vehicle width direction y. In FIGS. 5(*a*) and 5(*b*), guide lever 40 is connected to roof module 10 or a part of frame structure 36 in a rotatable manner (in the form of a fixed bearing) at one end (i.e., at one end side) in the area of drive axis 30. Thus, guide lever 40 can rotate about a first rotation point D1 relative to frame structure 36. The movability of guide lever 40 is limited to a rotation about the fixed bearing rotation axis. At its other end, guide lever 40 is connected to housing 22 of environmental sensor 16 in a rotatable manner at a housing underside of housing 22 in the case at hand. Thus, guide lever 40 can rotate about a second rotation point D2 relative to housing 22. The at least one tilting lever 58 is mounted on spindle nut 56 in a rotatable manner at one end as described above. Thus, tilting lever 58 can rotate about a third rotation point D3 relative to spindle nut 56. At its other end, tilting lever 58 is connected to guide lever 40 in a rotatable manner. Thus, tilting lever 58 can rotate about a fourth rotation point D4 relative to guide lever 40. When spindle nut 56 is moved away from a stop position (see FIG. 5(*a*)) along spindle 60 (starting from the retracted position), this has the result that the at least one tilting lever 58 rotates about rotation point D3 (in the clockwise sense). This rotation is transmitted to guide lever 40 via rotation point D4 (i.e., the rotation point bearing). As a result, guide lever 40 rotates about rotation point D1 and is otherwise fixed relative to roof module 10. Thus, guide lever 40 is rotated about rotation point D1 (in the clockwise sense). This movement has the effect that environmental sensor 16 is moved from the retracted position into the deployed position (see FIG. 5(*b*)) and thus raised along the vertical. When environmental sensor 16 is in the deployed position, the at least one tilting lever 58 is oriented essentially orthogonally to drive axis 30. As a result of this orientation, environmental sensor 16 is fixed in the deployed position since an outer force F acting on environmental sensor 16 is deflected into roof module 10 at a right angle to drive axis 30. So no torque that would cause environmental sensor 16 to be moved back into the retracted position is generated in any of the levers of kinematic system 18. This can only happen by actuation of drive 24. Kinematic system 18 according to the configuration example of FIG. 5 further comprises a guide rail 62 having a guide groove 64. A first sliding pin 66 is disposed in a movable manner in guide groove 64, which is preferably essentially straight. First sliding pin 66 is further fixed to housing 22 of environmental sensor 16. In order to prevent tilting of environmental sensor 16 about rotation point D2, kinematic system 18 further comprises a second sliding pin 68, which is also fixed to housing 22 of environmental sensor 16. First sliding pin 66 is disposed on housing 22 in such a manner that it is spaced apart from second sliding pin 68. The distance prevents environmental sensor 16 from tilting about rotation point D2. Guide rail 62 serves in particular to stabilize environmental sensor 16 during the retracting and deploying movements along the vertical.

FIGS. 6(*a*) to (*f*) illustrate a more complex configuration of kinematic system 18 according to the invention. In FIG. 6(*a*), environmental sensor 16 is shown in the retracted position. In FIG. 6(*b*), environmental sensor 16 is shown in the deployed position. In each of FIGS. 6(*c*) to (*f*), multiple levers of kinematic system 18 are shown in an isolated illustration in order to be able to better illustrate their interaction and their respective connections. In the sixth configuration example, the at least one tilting lever 58 comprises a first tilting lever arm 70 and a second tilting lever arm 72. Tilting lever arm 70 is connected to spindle nut 56 at one end in such a manner that it can rotate about a first rotation point E1. Furthermore, first tilting lever arm 70 is connected to second tilting lever arm 72 at one end in such a manner that it can rotate about a second rotation point E2 relative thereto (see FIGS. 6(*e*) and (*f*)). Furthermore, second tilting lever arm 72 is connected to a locking lever assembly 74 in a rotatable manner. Locking lever assembly 74 comprises at least a first and a second locking lever element 76 and 78, by means of which environmental sensor 16 can be fixed in the retracted position and in the deployed position with the result that environmental sensor 16 cannot be moved by an external force in either case. To this end, second tilting lever arm 72 is connected to first locking lever element 76 in such a manner that it can rotate about a third rotation point E3 (see FIG. 6(*b*)). Furthermore, first locking lever element 76 is connected to second locking lever element 78 in such a manner that it can rotate about a fourth rotation point E4.

In the sixth configuration example, guide lever 40 is connected to roof module 10 or frame structure 36 in a rotatable manner at one end. This connection forms first hinge rotation point G1 of this kinematic system 18 (see FIGS. 6(*c*) and 6(*d*)). At its other end, guide lever 40 is connected to housing 22 of environmental sensor 16 in a rotatable manner. This connection forms second hinge rotation point G2 of this kinematic system 18 (see FIGS. 6(*c*) and 6(*d*)). Furthermore, guide lever 40 is connected to an end of a connecting lever 80 in such a manner that it can rotate about a fifth rotation point E5 at a distance of about approx. ¼ of its length from hinge rotation point G1 along a longitudinal axis (see FIGS. 6(*a*) and 6(*b*)). At its other end, connecting lever 80 is connected to second locking element 78 of locking lever assembly 74 in such a manner that it can rotate about a sixth rotation point E6 (see FIGS. 6(*a*) and (*b*)). Second locking element 78 is essentially triangular and has at least the two connection points E4 and E6. Furthermore, second locking element 78 is mounted on roof module 10 in the form of a fixed bearing by means of a third connection point in such a manner that it can rotate about an axis of rotation E7 and is thus limited to a rotation about axis of rotation E7 relative to roof module 10. When spindle nut 56 is moved on spindle 60 along drive axis 30 starting from the retracted position of environmental sensor 16 (see FIG. 6(*a*)), this results in a rotation of first tilting lever arm 70 about axis of rotation E1. This rotation is translated into a rotation of second tilting lever arm 72 about axis of rotation E2, which is in turn translated into a rotation of first locking lever element 76 about axis of rotation E3. First locking lever element 76 in turn rotates second locking lever element 78 about axis of rotation E4. Since second locking lever element 78 is connected to connecting lever 80 in such a manner that it can rotate about axis of rotation E6, the rotation of second locking lever element 78 about axis of rotation E4 is transmitted to connecting lever 80. Second locking lever element 78 itself can only rotate about axis of rotation E7 since it is otherwise fixed relative to roof module 10 by means of a fixed bearing. Since it is connected to guide lever 40 in such a manner that it can rotate about axis of rotation E5, this rotation is translated into a rotation of guide lever 40 about hinge rotation point G1, which causes environmental sensor 16 to be moved from the retracted position into the deployed position, i.e., to be vertically raised in a direction away from the drive axis by means of guide lever 40. When environmental sensor 16 is in the deployed position, connecting lever 80 and second locking lever element 78 are in such a position that rotation points E5, E6 and E7 are all disposed in a straight line 82, which means that locking lever assembly 74 is in an over-center position, in which environmental sensor 16 can no longer be moved from the deployed position into the retracted position by an external force F (see FIG. 6(d)). The movability of environmental sensor 16 by an external force F is also effectively prevented by a locking position of second tilting lever arm 72 in connection with first locking lever element 76 and second locking lever element 78 when environmental sensor 16 is in the retracted position (see FIG. 6(e)). In this position, the long lever portion of essentially L-shaped second tilting lever arm 72 is oriented essentially parallel to drive axis 30.

Kinematic system 18 further comprises a first stabilizing lever 84, a second stabilizing lever 86 and a third stabilizing lever 88 for guiding and stabilizing the movement of environmental sensor 16. First stabilizing lever 84 is connected to roof module 10 or frame structure 36 in the form of a fixed bearing in a rotatable manner at one end. This connection forms third hinge rotation point G3 of this kinematic system 18 (see FIGS. 6(c) and 6(d)). At its other end, first stabilizing lever 84 is connected to third stabilizing lever 88 in a rotatable manner. This connection forms fourth hinge rotation point G4 of this kinematic system 18 (see FIGS. 6(c) and 6 (d)). Furthermore, second stabilizing lever 86 is connected to roof module 10 or frame structure 36 in the form of a fixed bearing in a rotatable manner at one end. This connection forms fifth hinge rotation point G5 of this kinematic system 18 (see FIGS. 6(c) and 6(d)). At its other end, second stabilizing lever 86 is connected to third stabilizing lever 88 in a rotatable manner. This connection forms sixths hinge rotation point G6 of this kinematic system 18 (see FIG. 6(c)). Third stabilizing lever 88 is connected to second stabilizing lever 86 at one end in such a manner that it can rotate about hinge rotation point G6. At its other end, third stabilizing lever 88 is connected to housing 22 of environmental sensor 16 in a rotatable manner. This connection forms seventh hinge rotation point G7 of this kinematic system 18 (see FIGS. 6(a) to (d)). This embodiment thus preferably forms a 7-hinge linkage, by means of which the adjustment mechanism of environmental sensor 16 is realized. Since first stabilizing lever 84 and second stabilizing lever 86 are disposed on roof module 10 in a fixed manner and since they are connected to each other and indirectly to housing 22 via third stabilizing lever 88, a movement of environmental sensor 16 can be guided in a controlled manner and environmental sensor 16 can be effectively prevented from tilting about one of hinge rotation points G2 or G7, for example.

FIGS. 7 to 10 show other configuration examples of kinematic system 18 according to the invention. Second locking lever element 78 is connected to roof module 10 in a rotatable manner via a fixed bearing 90. Fixed bearing 90 is preferably disposed on frame structure 36 of roof module 10 as a support component. Fixed bearing 90 serves as a main rotation point, about which kinematic system 18 or locking lever assembly 74 or second locking lever element 78 rotates together with levers 40 and 58, which are attached thereto in a rotatable manner. Second locking lever element 78 can rotate about a hinge rotation point G1 of fixed bearing 90. Tilting lever 58 is connected to spindle nut 56 of spindle drive 54 in a rotatable manner at one end and can rotate about a hinge rotation point G2. At its opposite end, tilting lever 58 is connected to second locking lever element 78 in such a manner that it can rotate about a hinge rotation point G3. Second locking lever element 78 is connected to one end of first locking lever element 76 in such a manner that it can rotate about a hinge rotation point G4. At its opposite end, first locking lever element 76 is connected to environmental sensor 16 or housing 22 in such a manner that it can rotate about a hinge rotation point G5. Housing 22 is connected to a support component of roof module 10 in such a manner that it can rotate about axis of rotation 38 by means of guide lever 40. FIG. 7(a) shows that rotation point G4 is located slightly outside of straight-angle line 82 when environmental sensor 16 is in the deployed position.

Housing 22 comprises a housing lid 92, which is flush with surrounding panel component 12 when environmental sensor 16 is in the retracted position. Environmental sensor 16 is disposed in an opening 94 of roof skin 14 or panel component 12 in a retractable and deployable manner together with housing 22. Housing lid 92 is disposed on top of housing 22. Furthermore, a weather-strip assembly 96 surrounding opening 94 is provided at opening 94, weather-strip assembly 96 being configured to prevent moisture from entering opening 94 and to generate a pre-load force relative to kinematic system 18, which fixes environmental sensor 16 at least in the deployed position. Weather-strip assembly 96 is a ring collar seal, for example. Housing lid 92 abuts against weather-strip assembly 96 in the retracted position, thus sealing opening 94 in a moisture-proof manner. For sealing in the deployed position, an abutment profile 98 is disposed on housing 22 (see FIG. 7(a)). Reference sign 99 designates an end-position stop at which first locking lever element 76 abuts against second locking lever element 78. FIG. 7(a) shows an exemplary force introduction with force F onto environmental sensor 16 or onto different areas of kinematic system 18.

Kinematic system 18 according the embodiment shown in FIGS. 7 to 10 comprises end-position stop 99 between first and second locking lever elements 76 and 78 in the deployed position of environmental sensor 16. When environmental sensor 16 is in the closed position, tilting lever 58 is situated at a favorable angle to locking lever element 78 and provides a stable end-position stop together with a spindle guide of spindle drive 54, which guides spindle 60.

FIG. 11 shows the vehicle roof 100 of a motor vehicle comprising roof module 10. Roof module 10 comprises panel component 12 for forming roof skin 14 of vehicle roof 100 of the vehicle (not shown in full). Environmental sensor 16 (a lidar sensor in this case) is disposed in a front center roof area of vehicle roof 100 or roof module 10 with respect to a longitudinal vehicle direction x. Other sensor types, such as multi-directional cameras and/or ultrasonic sensors and/or the like, can be employed.

Environmental sensor 16 is disposed directly behind front transverse beam 102, which defines the front header of the roof of the vehicle. Roof module 10 further comprises am embodiment of kinematic system 18. Kinematic system 18 makes it possible for environmental sensor 16 to be moved from a retracted position into a deployed position, in which environmental sensor 16 at least partially protrudes over roof skin 14, and further for environmental sensor 16 to be fixed in such a manner at least in the deployed position that environmental sensor 16 cannot be moved by an external force F. For example, force F can be an air resistance force, which acts on environmental sensor 16 in the deployed position. Alternatively or additionally, it can also be a wind force or another external force, for example.

In the case at hand, roof module 10 is inserted into roof frame 104 of the vehicle or placed on top of the at least two transverse beams 102 and at least two longitudinal beams 106, which form roof frame 104, as a structural unit. The roof module 10 in the configuration example shown has a panoramic roof 108.

FIGS. 12 and 13 each show a configuration example of kinematic system 18 according to the invention including environmental sensor 16 in the deployed position of environmental sensor 16 (see FIG. 12) and in the retracted position of environmental sensor 16 (see FIG. 13). Environmental sensor 16 comprises see-through portion 20, which can be made of a preferably shatter-proof plastic or another (semi-)transparent material. Furthermore, environmental sensor 16 comprises housing 22.

Kinematic system 18 comprises drive 24, which is shown schematically in each of the figures at hand. Drive 24 can be an electric motor or another type of actuator, for example.

In the case at hand, drive 24 comprises spindle 60 of spindle drive 54 as an output shaft. Slide 28 is guided on spindle 60 in a movable manner since a through-hole thread via which slide 28 interacts with spindle 60 is preferably provided in slide 28. A rotation of spindle 60 about drive axis 30 initiated by drive 24 causes slide 28 to translationally move along drive axis 30. In doing so, slide 28 preferably moves between a first stop position and a second stop position. The two stop positions are preferably defined by respective end points of guide slot 32, which is provided in slide 28 and within which guide pin 34 is guided in a sliding manner. Guide pin 34 is fixed to guide lever 40.

Guide lever 40 is connected to frame structure 36 or another support structure of roof module 10 or another body component of the motor vehicle in such a manner at one end that it can rotate about a bearing point F1. At its other end, guide lever 40 is connected to housing 22 of environmental sensor 16 in such a manner that it can rotate about a bearing point F2. Since guide lever 40 is fixed in place at one end while it is connected to roof module 10 in a such a manner that it can rotate about bearing point F1 and its movement is coupled to the movement of slide 28 along spindle 60, movement of slide 28 along drive axis 30 or movement or sliding of guide pin 34 in guide slot 32 of slide 32 is translated into a rotation of guide lever 40 about bearing point F1. Starting from the retracted position, guide lever 40 rotates about bearing point F1 until the guide pin is located in the upper stop position (see FIG. 12).

In order to stabilize environmental sensor 16 during the retracting and deploying movement and to additionally retract and deploy it not only rotationally but also translationally, environmental sensor 16 or housing 22 is also connected to roof module 10 via control lever 50. Control lever 50 is connected to housing 22 of environmental sensor 16 in a rotatable manner via a bearing point F3 at one end. At its other rend, control lever 50 is connected to frame structure 36 or another support structure of roof module 10 or another body part of the motor vehicle in such a manner that it can rotate about a bearing point F4. Guide lever 40 is spaced apart from control lever 50 and is preferably disposed on different frame structures or support components 36 or at least in different places of a support component 36. Guide lever 40 is preferably connected to housing 22 in a rotatable manner while being spaced apart from control lever 50. Guide lever 40 is preferably disposed in the area of the see-through portion of housing 22, whereas control lever 50 is disposed away from the see-through portion of housing 22. Environmental sensor 16 is preferably fixed in the deployed position by the self-locking effect of slide 28 on spindle 60 of the spindle drive.

FIG. 14 shows another configuration example of roof module 10 according to the invention. The at least one environmental sensor 16 is disposed in opening 94 of roof skin 14 or panel component 12 in a retractable and deployable manner with housing 22. A weather-strip assembly 96 surrounding opening 94 is provided at opening 94, weather-strip assembly 96 being configured to prevent moisture from entering opening 94. For example, weather-strip assembly 96 can comprise a plug-on seal plugged onto an edge of opening 94. Weather-strip assembly 96 can comprise a ring collar seal. Weather-strip assembly 96 is configured to prevent the entry of moisture at least in the retracted position and in the at least one deployed position. To this end, housing 22 has a beveled shape on both sides, as can be seen in FIG. 14. This shape allows the housing to come into moisture-proof contact with the weather-strip assembly 96 at least in the retracted position and in the at least one deployed position. Furthermore, kinematic system 18 is configured to move housing 22 in such a manner between the retracted position and the at least one deployed position that respective mating weather-strip portions 97 of housing 22 are in moisture-proof contact with weather-strip assembly 96 in the retracted position and in the at least one deployed position. In the case at hand, mating weather-strip portions 97 are formed integrally on the housing.

FIG. 15 shows the configuration example of FIG. 14 in a retracted position, i.e., in a closed state. FIG. 16 shows a schematic top view of the configuration example of FIGS. 14 and 15, which shows that weather-strip assembly 96 is circumferential. FIG. 15, in particular, shows that a closing lid element of housing 22, which is flush with surrounding panel component 12 in the closed position, also serves as a mating weather-strip portion 97. The lid element is formed integrally with housing 22 according to the configuration example of FIGS. 14 to 16.

The invention claimed is:

1. A roof module for forming a vehicle roof of a motor vehicle, the roof module comprising: a panel component whose outer surface at least partially forms a roof skin of the vehicle roof and serves as an outer sealing surface of the roof module, and at least one environmental sensor by means of which a vehicle environment can be detected during autonomous or semi-autonomous driving of the motor vehicle, further comprising a kinematic system having a drive and configured to move the at least one environmental sensor from a retracted position into a deployed position, in which the at least one environmental sensor protrudes beyond the roof skin to detect the vehicle environment, and to fix the at least one environmental sensor at least in the deployed position in such a manner that the at least one environmental sensor cannot be moved by an external force,
wherein at least one tilting lever is connected to a locking lever assembly in a rotatable manner, and
wherein the locking lever assembly comprises a first locking lever element and a second locking lever element by means of which the at least one environmental sensor is fixable in the retracted position and in the deployed position with the result that the at least one environmental sensor cannot be moved by an external force.

2. The roof module according to claim 1, wherein the guide lever is connected to the roof module in a rotatable manner at one end.

3. The roof module according to claim 1, wherein the guide pin is movable between a first stop of the guide slot, which fixes the at least one environmental sensor in the retracted position, and a second stop of the guide slot, which fixes the at least one environmental sensor in the deployed position.

4. The roof module according to claim 1, wherein the guide slot is essentially ramp-shaped.

5. The roof module according to claim 1, wherein the guide pin is disposed on the guide lever in a fixed manner.

6. The roof module according to claim 1, wherein the at least one environmental sensor is a lidar sensor and/or a radar sensor and/or a camera sensor and/or a multi-camera sensor.

7. The roof module according to claim 1, wherein the at least one environmental sensor comprise a housing with which it is disposed in an opening of the roof skin in a retractable and deployable manner, a weather-strip assembly surrounding the opening being provided, the weather-strip assembly being configured to prevent moisture from entering the opening and to generate a pre-load force relative to the kinematic system, the pre-load force fixing the at least one environmental sensor at least in the deployed position.

8. A motor vehicle comprising a roof module according to claim 1.

9. A roof module for forming a vehicle roof of a motor vehicle, the roof module comprising: a panel component whose outer surface at least partially forms a roof skin of the vehicle roof and serves as an outer sealing surface of the roof module, and at least one environmental sensor by means of which a vehicle environment can be detected during autonomous or semi-autonomous driving of the motor vehicle, further comprising a kinematic system having a drive and configured to move the at least one environmental sensor from a retracted position into a deployed position, in which the at least one environmental sensor protrudes beyond the roof skin to detect the vehicle environment, and to fix the at least one environmental sensor at least in the deployed position in such a manner that the at least one environmental sensor cannot be moved by an external force,
wherein the at least one tilting lever is connected to a locking lever assembly in a rotatable manner, and
wherein the second locking lever element of the locking lever assembly is connected in a rotatable manner to one end of the first locking lever element, which is connected to the environmental sensor and/or a housing, in which the environmental sensor is disposed, in a rotatable manner at its opposite end.

10. The roof module according to claim 9, wherein when the at least one environmental sensor is in the deployed position, the at least one tilting lever is oriented essentially orthogonally relative to the drive axis, thereby fixing the at least one environmental sensor in the deployed position.

11. The roof module according to claim 9, wherein when the at least one environmental sensor is in the retracted position, the spindle nut is located in a stop position unidirectionally along the drive axis.

12. A roof module for forming a vehicle roof of a motor vehicle, the roof module comprising: a panel component whose outer surface at least partially forms a roof skin of the vehicle roof and serves as an outer sealing surface of the roof module, and at least one environmental sensor by means of which a vehicle environment can be detected during autonomous or semi-autonomous driving of the motor vehicle, further comprising a kinematic system having a drive and configured to move the at least one environmental sensor from a retracted position into a deployed position, in which the at least one environmental sensor protrudes beyond the roof skin to detect the vehicle environment, and to fix the at least one environmental sensor at least in the deployed position in such a manner that the at least one environmental sensor cannot be moved by an external force,
wherein at least one tilting lever is connected to a locking lever assembly in a rotatable manner,
wherein the at least one tilting lever is connected to a spindle nut in a rotatable manner at one end and connected to a second locking lever element of the locking lever assembly in a rotatable manner at its opposite end, the second locking lever element of the locking lever assembly is connected in a rotatable manner to one end of a first locking lever element, which is connected to the environmental sensor in a rotatable manner at its opposite end.

13. The roof module according to claim 12, wherein the locking lever assembly is connected to the roof module in a rotatable manner via a fixed bearing, and the tilting lever is connected to a spindle nut in a rotatable manner at one end and to the locking lever assembly to the second locking lever element, in a rotatable manner at a tilting lever opposite end, the second locking lever element being connected to one end of the first locking lever element in a rotatable manner, the first locking lever element being connected to the at least one environmental sensor in a rotatable manner at a first locking lever element opposite end.

14. The roof module according to claim 13, wherein the first locking lever element is connected to a housing of the at least one environmental sensor.

* * * * *